United States Patent
Young

(10) Patent No.: US 6,325,734 B1
(45) Date of Patent: *Dec. 4, 2001

(54) RANDOM ENGAGEMENT ROLLER CHAIN SPROCKET WITH STAGED MESHING AND FLANK RELIEF TO PROVIDE IMPROVED NOISE CHARACTERISTICS

(75) Inventor: James D. Young, Chesaning, MI (US)

(73) Assignee: Cloyes Gear and Products, Inc., Mentor, OH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/321,246

(22) Filed: May 27, 1999

Related U.S. Application Data

(63) Continuation of application No. 08/992,306, filed on Dec. 17, 1997, now Pat. No. 5,921,879
(60) Provisional application No. 60/032,379, filed on Dec. 19, 1996.

(51) Int. Cl.[7] ................. F16H 7/06; F16G 1/28
(52) U.S. Cl. .................. 474/202; 474/205; 474/156
(58) Field of Search ................... 474/160, 164, 474/152–156, 202, 205, 168–170, 148, 157; 74/457–458

(56) References Cited

U.S. PATENT DOCUMENTS

| | | |
|---|---|---|
| Re. 30,018 | 6/1979 | Clemens et al. . |
| 320,734 | 6/1885 | Whiteley . |
| 536,813 | 4/1895 | MacPhail et al. . |
| 601,333 | 3/1898 | Barrett et al. . |
| 698,991 | 4/1902 | Morse . |
| 717,976 | 1/1903 | Dodge . |
| 984,509 | 2/1911 | Crowder . |
| 1,630,313 | 5/1927 | Rorabeck . |
| 1,808,369 | 6/1931 | Munroe . |
| 2,259,937 | * 10/1941 | Klaucke ............... 474/156 |
| 2,382,740 | 8/1945 | Noffsinger . |
| 2,385,923 | 10/1945 | Klaucke et al. . |
| 2,934,200 | 4/1960 | Fletcher et al. . |
| 3,130,791 | 4/1964 | Schmidt . |
| 3,194,609 | 7/1965 | Thurlow . |
| 3,298,406 | 1/1967 | Erickson . |
| 3,377,875 | 4/1968 | Sand . |
| 3,448,629 | 6/1969 | Pfrank et al. . |
| 3,495,468 | 2/1970 | Griffel . |
| 3,604,755 | 9/1971 | Krekeler . |
| 3,752,035 | 8/1973 | Cozzy et al. . |
| 3,824,869 | 7/1974 | Murphy . |

(List continued on next page.)

Primary Examiner—David A. Bucci
Assistant Examiner—Marcus Charles
(74) Attorney, Agent, or Firm—Fay, Sharpe, Fagan, Minnich & McKee, LLP

(57) ABSTRACT

A random engagement roller chain sprocket for use primarily in automotive engine chain drive applications which incorporates different asymmetrical tooth profiles for improved noise reduction. In particular, the sprocket includes a first plurality of sprocket teeth each having a first tooth profile including a first engaging flank, a first engaging root, and a first flat positioned between the first engaging flank and first engaging root wherein a first roller initially contacts the first flat at the onset of the first roller meshing with the sprocket. The sprocket also includes a second plurality of sprocket teeth each having a second tooth profile different from the first tooth profile and including a second engaging flank, a second engaging root, and a second flat tangent to the second engaging root remote from the second engaging flank wherein a second roller initially contacts the second flat at the onset of meshing between the second roller and the sprocket.

20 Claims, 30 Drawing Sheets

U.S. PATENT DOCUMENTS

| | | |
|---|---|---|
| 3,956,943 | 5/1976 | Yamasaki . |
| 4,016,772 | 4/1977 | Clemens et al. . |
| 4,036,071 | 7/1977 | McKnight et al. . |
| 4,058,023 * | 11/1977 | Smith ................................... 474/162 |
| 4,089,406 | 5/1978 | Teske et al. . |
| 4,099,423 | 7/1978 | Mullins . |
| 4,116,081 | 9/1978 | Luttrell et al. . |
| 4,168,634 * | 9/1979 | Griffel ................................... 474/148 |
| 4,174,642 | 11/1979 | Martin et al. . |
| 4,181,033 | 1/1980 | Nagano . |
| 4,200,000 | 4/1980 | Fluehmann . |
| 4,207,777 | 6/1980 | Fluehmann . |
| 4,223,528 | 9/1980 | Vuilleumier . |
| 4,274,184 | 6/1981 | Nordtvedt . |
| 4,294,132 | 10/1981 | Matusz . |
| 4,342,560 | 8/1982 | Ledvina et al. . |
| 4,348,200 | 9/1982 | Terada . |
| 4,378,965 | 4/1983 | Ishii et al. . |
| 4,401,420 | 8/1983 | Kasuya et al. . |
| 4,492,030 | 1/1985 | Beerens . |
| 4,509,323 | 4/1985 | Ledvina et al. . |
| 4,509,937 | 4/1985 | Ledvina et al. . |
| 4,521,207 | 6/1985 | Husted . |
| 4,522,611 | 6/1985 | Hiatt . |
| 4,531,926 | 7/1985 | Reeves, Jr. . |
| 4,559,028 | 12/1985 | Reeves, Jr. . |
| 4,571,218 | 2/1986 | Reeves, Jr. . |
| 4,604,080 | 8/1986 | Mizuno . |
| 4,645,475 | 2/1987 | Husted . |
| 4,653,340 | 3/1987 | LaBate . |
| 4,738,653 | 4/1988 | Riewerts et al. . |
| 4,758,209 | 7/1988 | Ledvina . |
| 4,758,210 | 7/1988 | Ledvina . |
| 4,813,916 | 3/1989 | Valin . |
| 4,832,668 | 5/1989 | Ledvina et al. . |
| 4,878,886 | 11/1989 | Kitabayashi et al. . |
| 4,889,521 | 12/1989 | Nagano . |
| 4,911,032 | 3/1990 | Steele et al. . |
| 4,915,604 | 4/1990 | Nagai . |
| 4,915,675 | 4/1990 | Avramidis . |
| 4,969,371 | 11/1990 | Allen . |
| 5,015,218 | 5/1991 | Macchiarulo et al. . |
| 5,022,280 | 6/1991 | Boiko et al. . |
| 5,073,151 | 12/1991 | Nagano . |
| 5,123,878 | 6/1992 | Nagano . |
| 5,133,695 | 7/1992 | Kobayashi . |
| 5,154,674 | 10/1992 | Avramidis et al. . |
| 5,162,022 | 11/1992 | Kobayashi . |
| 5,163,826 | 11/1992 | Cozens . |
| 5,318,483 | 6/1994 | Reid et al. . |
| 5,397,278 | 3/1995 | Suzuki et al. . |
| 5,427,580 | 6/1995 | Ledvina et al. . |
| 5,437,581 | 8/1995 | Ledvina et al. . |
| 5,437,582 | 8/1995 | Romano . |
| 5,458,543 | 10/1995 | Kobayashi . |
| 5,470,282 | 11/1995 | Ledvina et al. . |
| 5,503,598 | 4/1996 | Neuer et al. . |
| 5,570,852 | 11/1996 | Ikuta . |
| 5,830,096 * | 11/1998 | Schmidt et al. ................... 474/156 |
| 5,921,877 * | 7/1999 | Suzuki ................................. 474/156 |

FOREIGN PATENT DOCUMENTS

| | | |
|---|---|---|
| 851099 | 3/1939 | (FR) . |
| 515906 | 5/1976 | (SU) . |
| 595565 | 2/1978 | (SU) . |

OTHER PUBLICATIONS

International Standard ISO 606:1994(E), entitled "Short--pitch transmission precision roller chains and chain wheels." (19 pgs.).

DE–vol. 46, Mechanical Design and Synthesis ASME 1992, entitled "On the Dynamic Analysis of Roller Chain Drives: Part 1—Theory." (pp. 431–439).

* cited by examiner

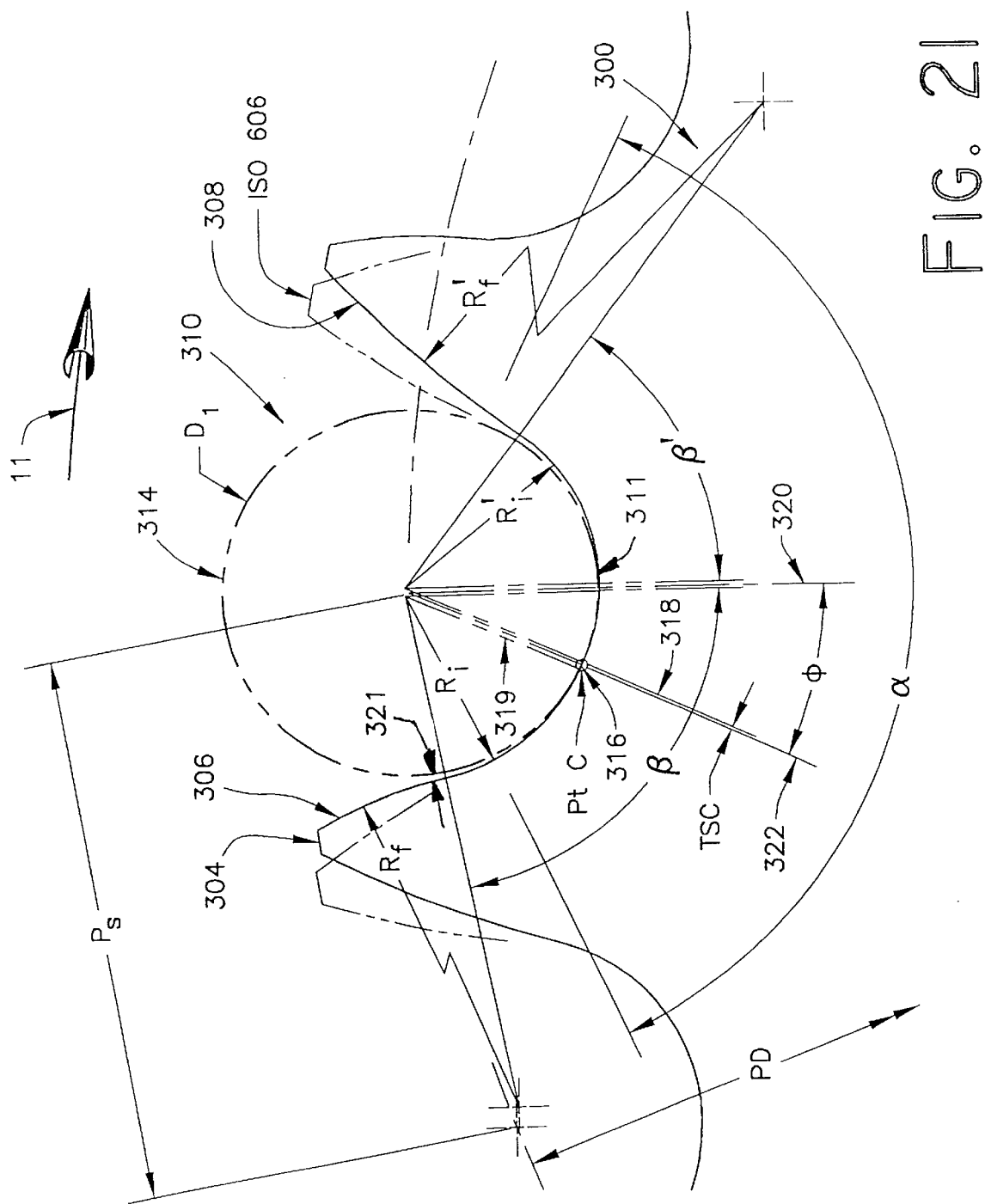

ISO

| Z | A | α (MIN) | α (MAX) | γ (MAX) | γ (MIN) |
|---|---|---|---|---|---|
| 18 | 20.000 | 115.00 | 135.00 | 22.500 | 12.500 |
| 19 | 18.947 | 115.26 | 135.26 | 22.895 | 12.895 |
| 20 | 18.000 | 115.50 | 135.50 | 23.250 | 13.250 |
| 21 | 17.143 | 115.71 | 135.71 | 23.571 | 13.571 |
| 22 | 16.364 | 115.91 | 135.91 | 23.864 | 13.864 |
| 23 | 15.652 | 116.09 | 136.09 | 24.130 | 14.130 |
| 24 | 15.000 | 116.25 | 136.25 | 24.375 | 14.375 |
| 25 | 14.400 | 116.40 | 136.40 | 24.600 | 14.600 |
| 26 | 13.846 | 116.54 | 136.54 | 24.808 | 14.808 |
| 27 | 13.333 | 116.67 | 136.67 | 25.000 | 15.000 |
| 28 | 12.857 | 116.79 | 136.79 | 25.179 | 15.179 |
| 29 | 12.414 | 116.90 | 136.90 | 25.345 | 15.345 |
| 30 | 12.000 | 117.00 | 137.00 | 25.500 | 15.500 |

Fig. 27
PRIOR ART

ASYMMETRICAL

| | | 1 | | 2 | | 3 | |
|---|---|---|---|---|---|---|---|
| Z | A | β (MAX) | γ (MIN) | β (MAX) | γ (MIN) | β (MAX) | γ (MIN) |
| 18 | 20.000 | 73.75 | 6.25 | 80.00 | 0 | 82.00 | -2 |
| 19 | 18.947 | 74.08 | 6.45 | 80.53 | 0 | 82.53 | -2 |
| 20 | 18.000 | 74.38 | 6.63 | 81.00 | 0 | 83.00 | -2 |
| 21 | 17.143 | 74.64 | 6.79 | 81.43 | 0 | 83.43 | -2 |
| 22 | 16.364 | 74.89 | 6.93 | 81.82 | 0 | 83.82 | -2 |
| 23 | 15.652 | 75.11 | 7.07 | 82.17 | 0 | 84.17 | -2 |
| 24 | 15.000 | 75.31 | 7.19 | 82.50 | 0 | 84.50 | -2 |
| 25 | 14.400 | 75.50 | 7.30 | 82.80 | 0 | 84.80 | -2 |
| 26 | 13.846 | 75.67 | 7.40 | 83.08 | 0 | 85.08 | -2 |
| 27 | 13.333 | 75.83 | 7.50 | 83.33 | 0 | 85.33 | -2 |
| 28 | 12.857 | 75.98 | 7.59 | 83.57 | 0 | 85.57 | -2 |
| 29 | 12.414 | 76.12 | 7.67 | 83.79 | 0 | 85.79 | -2 |
| 30 | 12.000 | 76.25 | 7.75 | 84.00 | 0 | 86.00 | -2 |

Fig. 28

RANDOM ENGAGEMENT ROLLER CHAIN SPROCKET WITH STAGED MESHING AND FLANK RELIEF TO PROVIDE IMPROVED NOISE CHARACTERISTICS

CROSS-REFERENCE TO RELATED APPLICATIONS

This application is a continuation of application Ser. No. 08/992,306, filed Dec. 17, 1997, now U.S. Pat. No. 5,921,879, which claims priority from U.S. Provisional Patent Application Serial No. 60/032,379, filed Dec. 19, 1996.

BACKGROUND OF THE INVENTION

The present invention relates to the automotive timing chain art. It finds particular application in conjunction with a unidirectional roller chain sprocket for use in automotive camshaft drive applications and will be described with particular reference thereto. However, the present invention may also find application in conjunction with other types of chain drive systems and applications where reducing the noise levels associated with chain drives is desired.

Roller chain sprockets for use in camshaft drives of automotive engines are typically manufactured according to ISO (International Organization for Standardization) standard 606:1994(E). The ISO-606 standard specifies requirements for short-pitch precision roller chains and associated chain wheels or sprockets.

FIG. 1 illustrates a symmetrical tooth space form for an ISO-606 compliant sprocket. The tooth space has a continuous fillet or root radius $R_i$ extending from one tooth flank (i.e., side) to the adjacent tooth flank as defined by the roller seating angle $\alpha$. The flank radius $R_f$ is tangent to the roller seating radius $R_i$ at the tangency point TP. A chain with a link pitch P has rollers of diameter $D_1$ in contact with the tooth spaces. The ISO sprocket has a chordal pitch also of length P, a root diameter $D_2$, and Z number of teeth. The pitch circle diameter PD, tip or outside diameter OD, and tooth angle A (equal to 360°/Z) further define the ISO-606 compliant sprocket. The maximum and minimum roller seating angle a is defined as:

$$\alpha_{max}=(140°-90°)/Z \text{ and } \alpha_{min}=(120°-90)/Z$$

With reference to FIG. 2, an exemplary ISO-606 compliant roller chain drive system 10 rotates in a clockwise direction as shown by arrow 11. The chain drive system 10 includes a drive sprocket 12, a driven sprocket 14 and a roller chain 16 having a number of rollers 18. The sprockets 12, 14, and chain 16 each generally comply with the ISO-606 standard.

The roller chain 16 engages and wraps about sprockets 12 and 14 and has two spans extending between the sprockets, slack strand 20 and taut strand 22. The roller chain 16 is under tension as shown by arrows 24. The taut strand 22 may be guided from the driven sprocket 14 to the drive sprocket 12 with a chain guide 26. A first roller 28 is shown at the onset of meshing at a 12 o'clock position on the drive sprocket 12. A second roller 30 is adjacent to the first roller 28 and is the next roller to mesh with the drive sprocket 12.

Chain drive systems have several components of undesirable noise. A major source of roller chain drive noise is the sound generated as a roller leaves the span and collides with the sprocket during meshing. The resultant impact noise is repeated with a frequency generally equal to that of the frequency of the chain meshing with the sprocket. The loudness of the impact noise is a function of the impact energy ($E_A$) that must be absorbed during the meshing process. The impact energy absorbed is related to engine speed, chain mass, and the impact velocity between the chain and the sprocket at the onset of meshing. The impact velocity is affected by the chain-sprocket engagement geometry, of which an engaging flank pressure angle (FIG. 3) is a factor, where:

$$E_A = \frac{wP}{2000}V_A^2;$$

$$V_A = \frac{\pi nP}{30000}\sin\left(\frac{360}{Z}+\gamma\right);$$

$$\gamma = \frac{180-A-\alpha}{2}; \text{ and}$$

$E_A$ = Impact Energy [N·m]
$V_A$ = Roller Impact Velocity [m/s]
$\gamma$ = Engaging Flank Pressure Angle
$n$ = Engine Speed [RPM]
$w$ = Chain Mass [Kg/m]
$Z$ = Number of Sprocket Teeth
$A$ = Tooth Angle (360°/Z)
$\alpha$ = Roller Seating Angle
$P$ = Chain Pitch (Chordal Pitch)

The impact energy ($E_A$) equation presumes the chain drive kinematics will conform generally to a quasi-static analytical model and that the roller-sprocket driving contact will occur at a tangent point TP (FIG. 3) of the flank and root radii as the sprocket collects a roller from the span.

As shown in FIG. 3, the pressure angle y is defined as the angle between a line A extending from the center of the engaging roller 28, when it is contacting the engaging tooth flank at the tangency point TP, through the center of the flank radius $R_f$, and a line B connecting the centers of the fully seated roller 28, when it is seated on root diameter $D_2$, and the center of the next meshing roller 30, as if it were also seated on root diameter $D_2$ in its engaging tooth space. The roller seating angles a and pressure angles listed in FIG. 27 are calculated from the equations defined above. It should be appreciated that y is a minimum when a is a maximum. The exemplary 18-tooth, ISO-606 compliant, sprocket 12 of FIG. 3 will have a pressure angle in the range of 12.5° to 22.5° as listed in the table of FIG. 27.

FIG. 3 also shows the engagement path (phantom rollers) and the driving contact position of roller 28 (solid) as the drive sprocket 12 rotates in the direction of arrow 11. FIG. 3 depicts the theoretical case with chain roller 27 seated on root diameter $D_2$ of a maximum material sprocket with both chain pitch and sprocket chordal pitch equal to theoretical pitch P. For this theoretical case, the noise occurring at the onset of roller engagement has a radial component $F_{IR}$ as a result of roller 30 colliding with the root surface $R_i$ and a tangential component $F_{IT}$ generated as the same roller 28 collides with the engaging tooth flank at point TP as the roller moves into driving contact. It is believed that the radial impact occurs first, with the tangential impact following nearly simultaneously. Roller impact velocity $V_A$ is shown to act through, and is substantially normal to, engaging flank tangent point TP with roller 28 in driving contact at point TP.

The impact energy ($E_A$) equation accounts only for a tangential roller impact during meshing. The actual roller engagement, presumed to have a tangential and radial impact (occurring in any order), would therefore seem to be at variance with the impact energy ($E_A$) equation. The application of this quasi-static model, which is beneficially used as a directional tool, permits an analysis of those features that may be modified to reduce the impact energy that must be absorbed during the tangential roller-sprocket collision at the onset of meshing. The radial collision during meshing, and its effect on noise levels, can be evaluated apart from the impact energy ($E_A$) equation.

Under actual conditions as a result of feature dimensional tolerances, there will normally be a pitch mismatch between the chain and sprocket, with increased mismatch as the components wear in use. This pitch mismatch serves to move the point of meshing impact, with the radial collision still occurring at the root surface $R_i$ but not necessarily at $D_2$. The tangential collision will normally be in the proximity of point TP, but this contact could take place high up on the engaging side of root radius $R_i$ or even radially outward from point TP on the engaging flank radius $R_f$ as a function of the actual chain-sprocket pitch mismatch.

Reducing the engaging flank pressure angle γ reduces the meshing noise levels associated with roller chain drives, as predicted by the impact energy ($E_A$) equation set forth above. It is feasible but not recommended to reduce the pressure angle γ while maintaining a symmetrical tooth profile, which could be accomplished by simply increasing the roller seating angle α, effectively decreasing the pressure angle for both flanks. This profile as described requires that a worn chain would, as the roller travels around a sprocket wrap (discussed below), interface with a much steeper incline and the rollers would necessarily ride higher up on the coast flank prior to leaving the wrap.

Another source of chain drive noise is the broadband mechanical noise generated in part by shaft torsional vibrations and slight dimensional inaccuracies between the chain and the sprockets. Contributing to a greater extent to the broadband mechanical noise level is the intermittent or vibrating contact that occurs between the unloaded rollers and the sprocket teeth as the rollers travel around the sprocket wrap. In particular, ordinary chain drive system wear comprises sprocket tooth face wear and chain wear. The chain wear is caused by bearing wear in the chain joints and can be characterized as pitch elongation. It is believed that a worn chain meshing with an ISO standard sprocket will have only one roller in driving contact and loaded at a maximum loading condition.

With reference again to FIG. 2, driving contact at maximum loading occurs as a roller enters a drive sprocket wrap 32 at engagement. Engaging roller 28 is shown in driving contact and loaded at a maximum loading condition. The loading on roller 28 is primarily meshing impact loading and the chain tension loading. The next several rollers in the wrap 32 forward of roller 28 share in the chain tension loading, but at a progressively decreasing rate. The loading of roller 28 (and to a lesser extent for the next several rollers in the wrap) serves to maintain the roller in solid or hard contact with the sprocket root surface 34.

A roller 36 is the last roller in the drive sprocket wrap 32 prior to entering the slack strand 20. Roller 36 is also in hard contact with drive sprocket 12, but at some point higher up (e.g., radially outwardly) on the root surface 34. With the exception of rollers 28 and 36, and the several rollers forward of roller 28 that share the chain tension loading, the remaining rollers in the drive sprocket wrap 32 are not in hard contact with the sprocket root surface 34, and are therefore free to vibrate against the sprocket root surfaces as they travel around the wrap, thereby contributing to the generation of unwanted broadband mechanical noise.

A roller 38 is the last roller in a sprocket wrap 40 of the driven sprocket 14 before entering the taut strand 22. The roller 38 is in driving contact with the sprocket 14. As with the roller 36 in the drive sprocket wrap 32, a roller 42 in the sprocket wrap 40 is in hard contact with a root radius 44 of driven sprocket 14, but generally not at the root diameter.

It is known that providing pitch line clearance (PLC) between sprocket teeth promotes hard contact between the chain rollers and sprocket in the sprocket wrap, even as the roller chain wears. The amount of pitch line clearance added to the tooth space defines a length of a short arc that is centered in the tooth space and forms a segment of the root diameter $D_2$. The root fillet radius R is tangent to the flank radius $R_F$ and the root diameter arc segment. The tooth profile is still symmetrical, but $R_i$ is no longer a continuous fillet radius from one flank radius to the adjacent flank radius. This has the effect of reducing the broadband mechanical noise component of a chain drive system. However, adding pitch line clearance between sprocket teeth does not reduce chain drive noise caused by the roller-sprocket collision at impact.

Chordal action, or chordal rise and fall, is another important factor affecting the operating smoothness and noise levels of a chain drive, particularly at high speeds. Chordal action occurs as the chain enters the sprocket from the free span during meshing and it can cause a movement of the free chain in a direction perpendicular to the chain travel but in the same plane as the chain and sprockets. This chain motion resulting from chordal action will contribute an objectionable noise level component to the meshing noise levels, so it is therefore beneficial to reduce chordal action inherent in a roller chain drive.

FIGS. 4a and 4b illustrate the chordal action for an 18-tooth, ISO-606 compliant, sprocket having a chordal pitch of 9.525 mm. Chordal rise 45 may conventionally be defined as the displacement of the chain centerline as the sprocket rotates through an angle A/2, where:

$$\text{Chordal rise} = r_p - r_c = r_p[1 - \cos(180°/Z)]$$

where $r_c$ is the chordal radius, or the distance from the sprocket center to a pitch chord of length P; $r_p$ is the actual theoretical pitch radius; and Z is the number of sprocket teeth.

It is known that a short pitch chain provides reduced chordal action compared to a longer pitch chain having a similar pitch radius. FIGS. 4a and 4b show only the drive sprocket and assume a driven sprocket (not shown) also having 18-teeth and in phase with the drive sprocket shown. In other words, at T=0 (FIG. 4a), both sprockets will have a tooth center at the 12 o'clock position. Accordingly, this chain drive arrangement under quasi-static conditions will have a top or taut strand that will move up and down in a uniform manner a distance equal to that of the chordal rise. At T=0, a roller 46 is at the onset of meshing, with chordal pitch P horizontal and in line with taut strand 22. At T=0+(A/2), (FIG. 4b), roller 46 has moved to the 12 o'clock position.

For many chain drives, the drive and driven sprockets will be of different sizes and will not necessarily be in phase. The chain guide 26 (FIG. 2) has the primary purpose to control chain strand vibration in the taut span. The geometry of the guide-chain interface also defines the length of free span chain over which chordal rise and fall is allowed to operate. FIG. 5 is an enlarged view of FIG. 2 showing the first roller 28 at the onset of engagement and the second roller 30 as the next roller about to mesh with sprocket 12. In this example, the chain guide 26 controls and guides the engaging portion of the taut strand 22 except for five (5) unsupported or "free" link pitches extending between the chain guide 26 and the engaging roller 28. This length of unsupported link pitches for the engaging portion of taut strand 22 in this example is horizontal when roller 28 is at the 12 o'clock position.

With reference to FIGS. 6 and 7, the drive sprocket 12 is rotated in a clockwise direction to advance roller 28 to a new angular position (A/2)+ω, where ω is the added rotation angle as determined by a quasi-static engagement geometry with roller 28 being fully seated and roller 30 is at the instant of sprocket engagement. As shown in FIG. 6, roller 28 is considered to be seated and in hard contact with the root surface at $D_2$ at the onset of meshing of roller 30, and a straight line is assumed for the chain span from roller 28 to a chain pin center 48, about which the unsupported or "free" span from pin 48 to engaging roller 30 is considered to rotate.

As a result of the chordal action, the engaging free span is no longer horizontal to satisfy the roller engaging geometry. This is in contrast to the chain drive as described in FIG. 4*a* in which chordal action causes the taut strand to move uniformly, but in a horizontal path because the drive and driven sprockets have the same number of teeth and the sprocket teeth are in phase. It should be appreciated that the straight line assumption is valid only in a quasi-static model. The amount of movement or deviation from the straight line assumption will be a function of the drive dynamics, the chain control devices, and the chain drive and sprocket geometry. The location and chain-interfacing contour of the chain guide 26 will determine the number of free span pitches for which chain motion will take place as a result of the chordal rise and fall during the roller meshing process.

As best seen in FIG. 7, assuming that rollers 28 and 30 are in hard contact with the sprocket root surfaces at $D_2$, the chordal rise is the perpendicular displacement of the center of roller 30 (located on the pitch diameter PD) from the taut span 22 path as it moves from its initial meshing position shown to the 12 o'clock position.

Accordingly, it is desirable to develop a new and improved roller chain drive system which meets the above-stated needs and overcomes the foregoing disadvantages and others while providing better and more advantageous results.

SUMMARY OF THE INVENTION

In accordance with one aspect of the present invention, a sprocket is disclosed. The sprocket includes a first plurality of sprocket teeth each having a first tooth profile including a first engaging flank, a first engaging root, and a first flat positioned between the first engaging flank and first engaging root, a first roller initially contacting the first flat at the onset of the first roller meshing with the sprocket. The sprocket further includes a second plurality of sprocket teeth each having a second tooth profile different from the first tooth profile and including a second engaging flank, a second engaging root, and a second flat tangent to the second engaging root remote from the second engaging flank, a second roller initially contacting the second flat at the onset of meshing between the second roller and the sprocket.

In accordance with another aspect of the present invention, a sprocket is disclosed. The sprocket includes a first plurality of sprocket teeth each having a first asymmetrical tooth profile which is constructed for providing a tangential contact with a first roller at an onset of the first roller meshing with the sprocket, and a second plurality of sprocket teeth each having a second asymmetrical tooth profile which is constructed for providing a radial contact with a second roller at an onset of the second roller meshing with the sprocket.

In accordance with a further aspect of the present invention, a unidirectional roller chain drive system is disclosed. The unidirectional roller chain drive system includes a first sprocket, a second sprocket, and a roller chain having rollers in engaging contact with the first and second sprockets. At least one of the first and second sprockets includes a first plurality of sprocket teeth each having a first tooth profile including a first engaging flank, a first engaging root, and a first flat positioned between the first engaging flank and first engaging root wherein a first roller initially contacts the first flat at the onset of the first roller meshing with the sprocket. At least one of the first and second sprockets also includes a second plurality of sprocket teeth each having a second tooth profile different from the first tooth profile and including a second engaging flank, a second engaging root, and a second flat tangent to the second engaging root remote from the second engaging flank, a second roller initially contacting the second flat at the onset of meshing between the second roller and the sprocket.

In accordance with yet another aspect of the present invention, a method of modifying a meshing impact frequency of a roller chain meshing with a sprocket is disclosed. The method includes (a) rotating the sprocket to cause a first roller of the roller chain to tangentially contact an engaging flank of a first sprocket tooth at an onset of the first roller meshing with the first sprocket tooth, and (b) rotating the sprocket to cause a second roller of the roller chain to radially contact a root surface of a second sprocket tooth at an onset of the second roller meshing with the second sprocket tooth.

One advantage of the present invention is the provision of a roller chain sprocket which incorporates a flank flat on an engaging tooth surface which facilitates altering a meshing contact from a first tooth profile to a second tooth profile.

Another advantage of the present invention is the provision of a roller chain sprocket which incorporates a flank flat on an engaging tooth surface which effects a time delay between an initial roller-to first sprocket tooth profile contact and an initial roller-to-second sprocket tooth profile contact.

Another advantage of the present invention is the provision of a roller chain sprocket which incorporates a flank flat on an engaging tooth surface of a first tooth profile which facilitates phasing a frequency of initial roller-to-engaging flank contacts of the first tooth profile relative to initial roller-to-engaging flank contacts of a second tooth profile to alter the rhythm of the initial roller-to-first engaging flank and the roller-to-second engaging flank contacts.

Another advantage of the present invention is the provision of a roller chain sprocket which incorporates added pitch mismatch between the sprocket and roller chain to facilitate a "staged" roller-to-sprocket impact.

Still another advantage of the present invention is the provision of a roller chain sprocket which incorporates an inclined root surface on an engaging flank, a coast flank, or both an engaging flank and a coast flank to provide tooth space clearance.

Yet another advantage of the present invention is the provision of a roller chain sprocket which minimizes impact noise generated by a roller-sprocket collision during meshing.

A further advantage of the present invention is the provision of a roller chain sprocket which minimizes broadband mechanical noise generated by unloaded rollers in a sprocket wrap.

A still further advantage of the present invention is the provision of a roller chain sprocket which provides a "staged" roller impact wherein a tangential impact occurs first followed by a radial impact at full mesh.

Yet a further advantage of the present invention is the provision of a roller chain sprocket which spreads roller engagement over a significant time interval to provide for a more gradual load transfer, thereby minimizing roller-sprocket impact and the inherent noise generated therefrom.

Yet a further advantage of the present invention is the provision of a roller chain sprocket having two sets of sprocket teeth incorporating different tooth profiles which cooperate to reduce chain drive system noise levels below a noise level which either tooth profile used alone would produce.

Further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

FIG. 21 is an enlarged view of the sprocket of FIG. 20 showing an asymmetrical tooth space form which incorporates engaging flank relief and tooth space clearance in accordance with the present invention;

FIG. 27 is a table listing roller seating angles α and pressure angles for a number of different ISO-606 compliant sprocket sizes; and FIG. 28 is a table listing the maximum Beta (β) angles and the corresponding minimum pressure angles (γ) for three different asymmetrical tooth space profiles (1–3) of varying sprocket sizes.

DETAILED DESCRIPTION OF THE PREFERRED EMBODIMENTS

Figure 8:
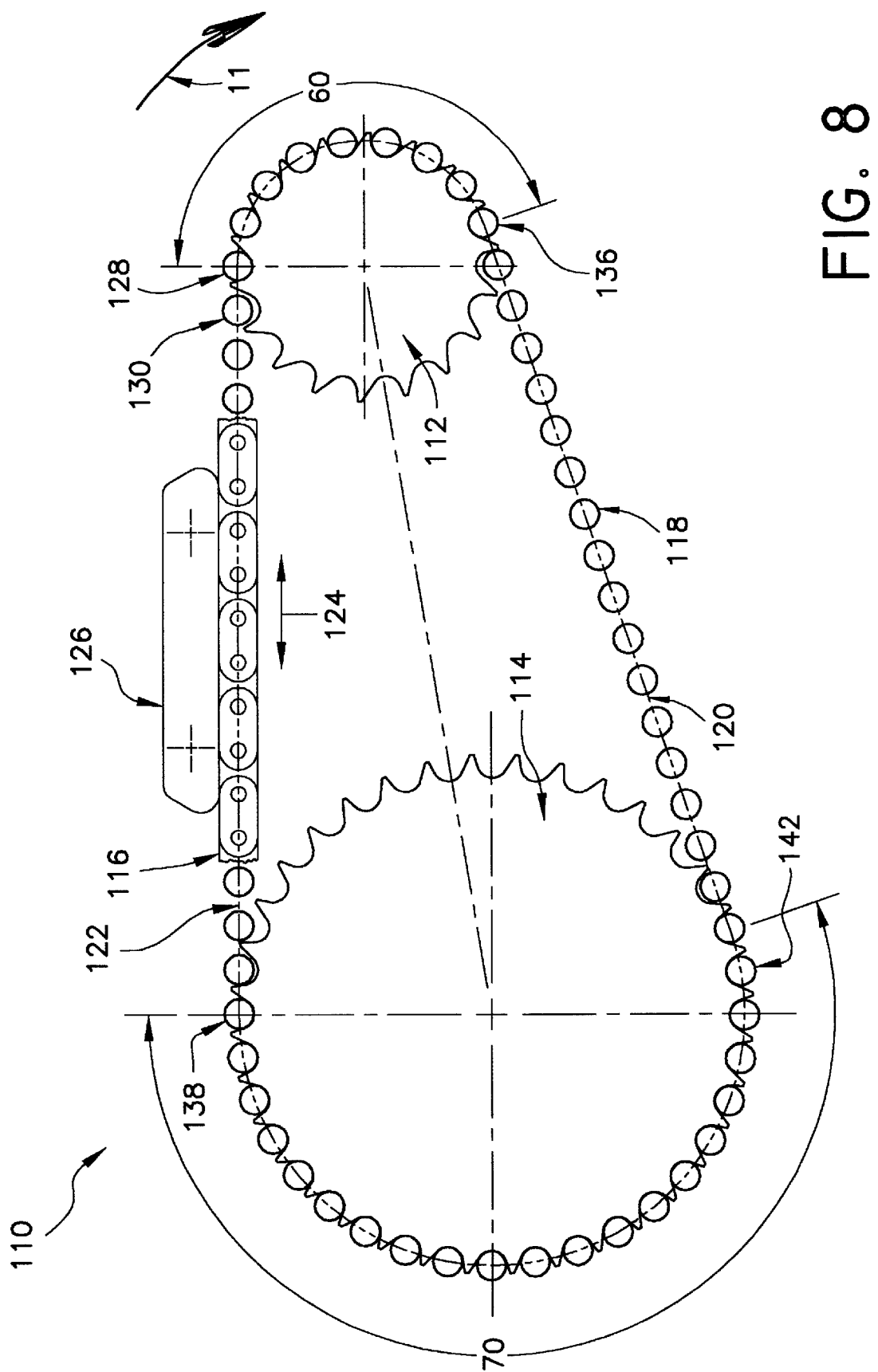
FIG. 8 illustrates a roller chain drive system having a roller chain drive sprocket and driven sprocket which incorporate the features of the present invention therein.

With reference now to FIG. 8, a roller chain drive system 110 includes a drive sprocket 112 and a driven sprocket 114 which incorporate the features of the present invention therein. The roller chain drive system 110 further includes a roller chain 116 having a number of rollers 118 which engage and wrap about sprockets 112, 114. The roller chain rotates in a clockwise direction as shown by arrow 11.

The roller chain 116 has two spans extending between the sprockets, slack strand 120 and taut strand 122. The roller chain 116 is under tension as shown by arrows 124. A central portion of the taut strand 122 may be guided from the driven sprocket 114 to the drive sprocket 112 with a chain guide 126. A first roller 128 is shown fully seated at a 12 o'clock position on the drive sprocket 112. A second roller 130 is adjacent to the first roller 128 and is about to mesh with the drive sprocket 112.

To facilitate a description of the asymmetrical tooth profiles of the present invention, reference will be made only to the drive sprocket 112. However, the asymmetrical tooth profiles of the present invention can be equally applied to the driven sprocket 114, as well as to other types of sprockets such as idler sprockets and sprockets associated with counter rotating balance shafts.

Figure 9:
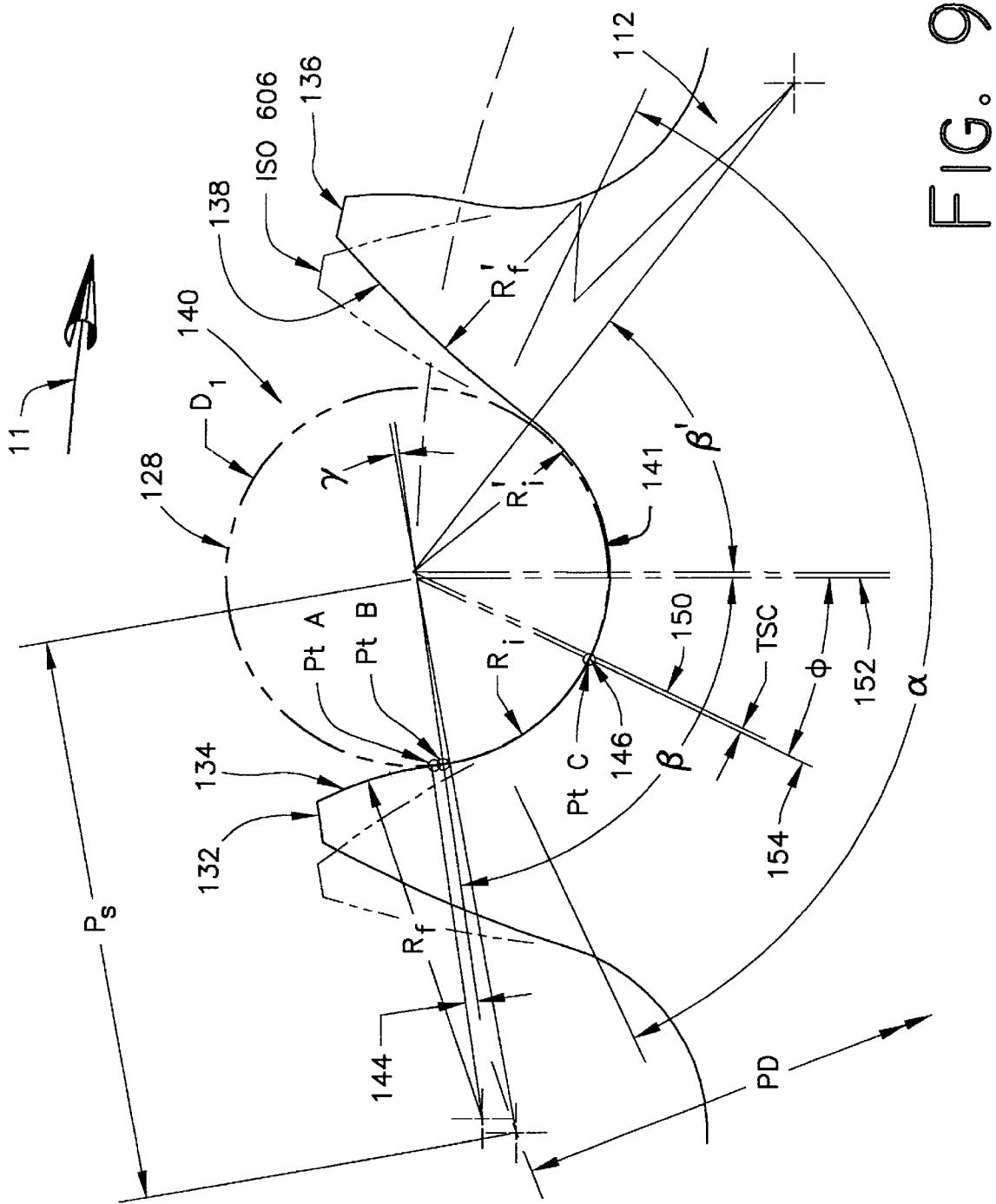
FIG. 9 illustrates the roller chain drive sprocket of FIG. 8 with an asymmetrical tooth space form in accordance with one embodiment of the present invention.
Figure 10:
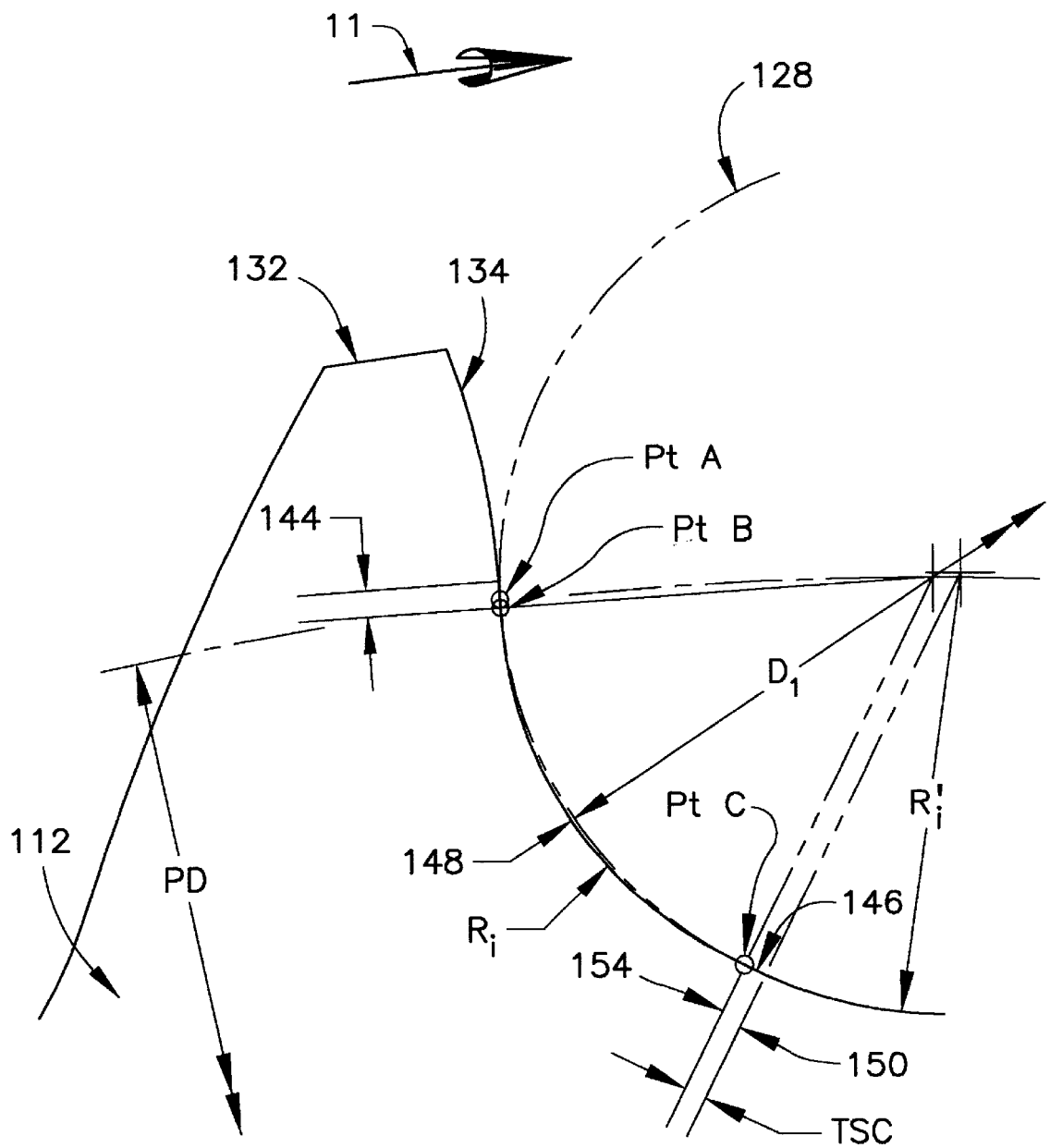
FIG. 10 is an enlarged view of the asymmetrical tooth space form of FIG. 9 showing a roller in two-point contact with the sprocket.

Referring now to FIGS. 9 and 10, the sprocket 112 includes a first tooth 132 having an engaging flank 134, and a second tooth 136 having a coast or disengaging flank 138. The engaging flank 134 and coast flank 138 cooperate to define a tooth space 140 having a root surface 141. The tooth space 140 receives the engaging roller 128 (shown in phantom). The engaging roller 128 has a diameter $D_1$, and is shown fully seated in two-point contact within the tooth space 140 as described further below. More particularly, the engaging roller 128, when fully seated in the tooth space, contacts two lines B and C that extend axially along each sprocket tooth surface or face (i.e., in a direction orthogonal to the plane of the drawings). However, to facilitate a description thereof, the lines A, B, and C are hereafter shown and referred to as contact points within the tooth space.

The engaging flank 134 has a radius $R_f$ which is tangent to a radially outer end of a flank flat 144. The asymmetrical engaging flank radius Rf is smaller than the $R_{fISO}$ radius specified by the ISO-606 standard. However, the magnitude of the asymmetrical engaging flank radius $R_f$ should be as large as possible while still satisfying the roller meshing (engaging) and disengaging geometry. The location of the flank flat 144 is defined by an angle β, with the flat orientation being normal or perpendicular to a line that passes through Point B and the center of roller 128 when the roller is contacting the sprocket at Points B and C. The length of the flank flat, which extends radially outward from Point B, affects a time delay between an initial tangential impact between sprocket 112 and roller 128 at a first contact Point A along the flank flat 144, and a subsequent radial impact at Point C. It is believed that the roller stays in contact with the flank flat from its initial tangential contact at Point A until the roller moves to a fully engaged two-point contact position at Points B and C. The pressure angle γ, the amount of pitch mismatch between the chain and the sprocket, and the length of the flank flat can be varied to achieve a desired initial roller contact Point A at the onset of roller-sprocket meshing.

It should be appreciated that flank (tangential) contact always occurs first, with radial contact then occurring always at Point C regardless of chain pitch length. In contrast, with known tooth space forms (e.g., ISO-606 compliant and asymmetrical) incorporating single-point contact (e.g. single line contact), an engaging roller must move to a driving position after making radial contact. The pressure angles γ therefore assume that the engaging roller will contact at the flank radius/root radius tangent point. Thus, the meshing contact location of the known single point/line tooth space forms is pitch "sensitive" to determine where the radial impact as well as tangential impact will occur.

The engaging flank roller seating angle β (FIG. 9) and a disengaging flank roller seating angle β' replace the ISO-606 roller seating angle α (ISO profile shown in phantom). As illustrated in FIG. 9, β is the angle defined by the line 152 passing through the center of roller 128 and the sprocket center to a second line which also passes through the center of roller 128 and Point B. Also shown in FIG. 9, β' is the angle defined by a line passing through the arc center of $R_i'$ and the sprocket center to a second line which also passes through the arc center of $R_i'$ and the arc center of $R_f'$. The pressure angle γ is a function of the engaging flank roller seating angle β. That is, as β increases, γ decreases. A minimum asymmetrical pressure angle can be determined from the following equation, where:

$$\gamma_{min} = \beta_{max} - (\alpha_{max}/2 + \gamma_{ISO\ min})$$

Therefore, an asymmetrical pressure angle $\gamma_{min}=0$ when $\beta_{max} = (\alpha_{max}/2 + \gamma_{ISO\ min})$ as illustrated in the table of FIG. 28. FIG. 28 lists the maximum Beta (β) angles and the corresponding minimum pressure angles (γ) for several sprocket sizes of three different asymmetrical tooth space profiles (1–3). It should be appreciated that reducing the engaging flank pressure angle γ reduces the tangential impact force component $F_{IA}$ (FIG. 14) and thus the tangential impact noise contribution to the overall noise level at the onset of engagement.

That is, the impact force $F_{IA}$ is a function of the impact velocity which in turn is related to pressure angle γ. As pressure angle γ is reduced, it provides a corresponding reduction in the impact velocity between the chain and the sprocket at the onset of meshing. A minimum pressure angle γ also facilitates a greater separation or distance between tangential contact points A and B to further increase or maximize engagement "staging". In the preferred embodiment, the engaging flank pressure angle γ is in the range of about −2.0° to about +5° to optimize the staged impact between the roller and the sprocket.

Figure 1:
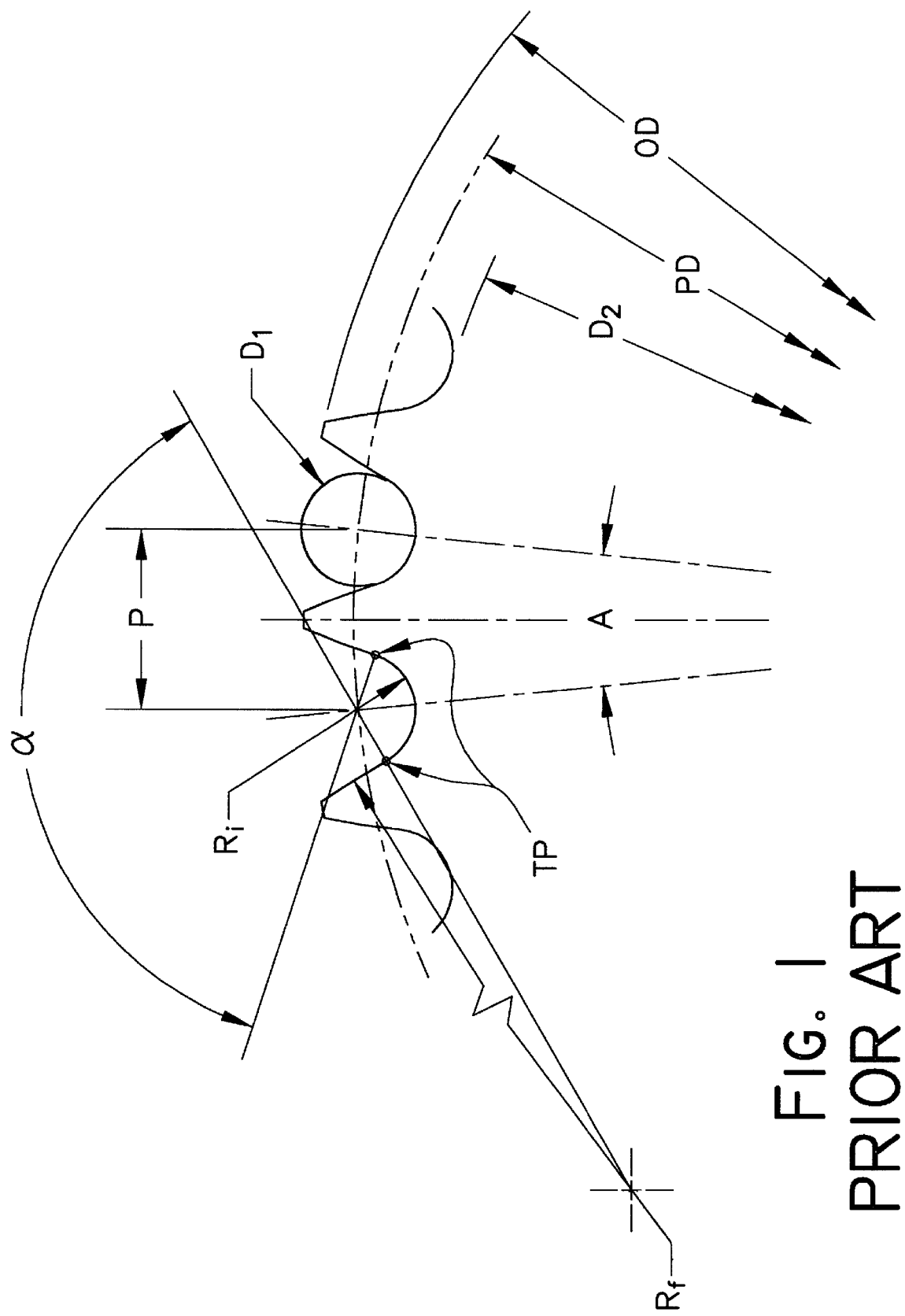
FIG. 1 illustrates a symmetrical tooth space form for a ISO-606 compliant roller chain sprocket.
Figure 2:
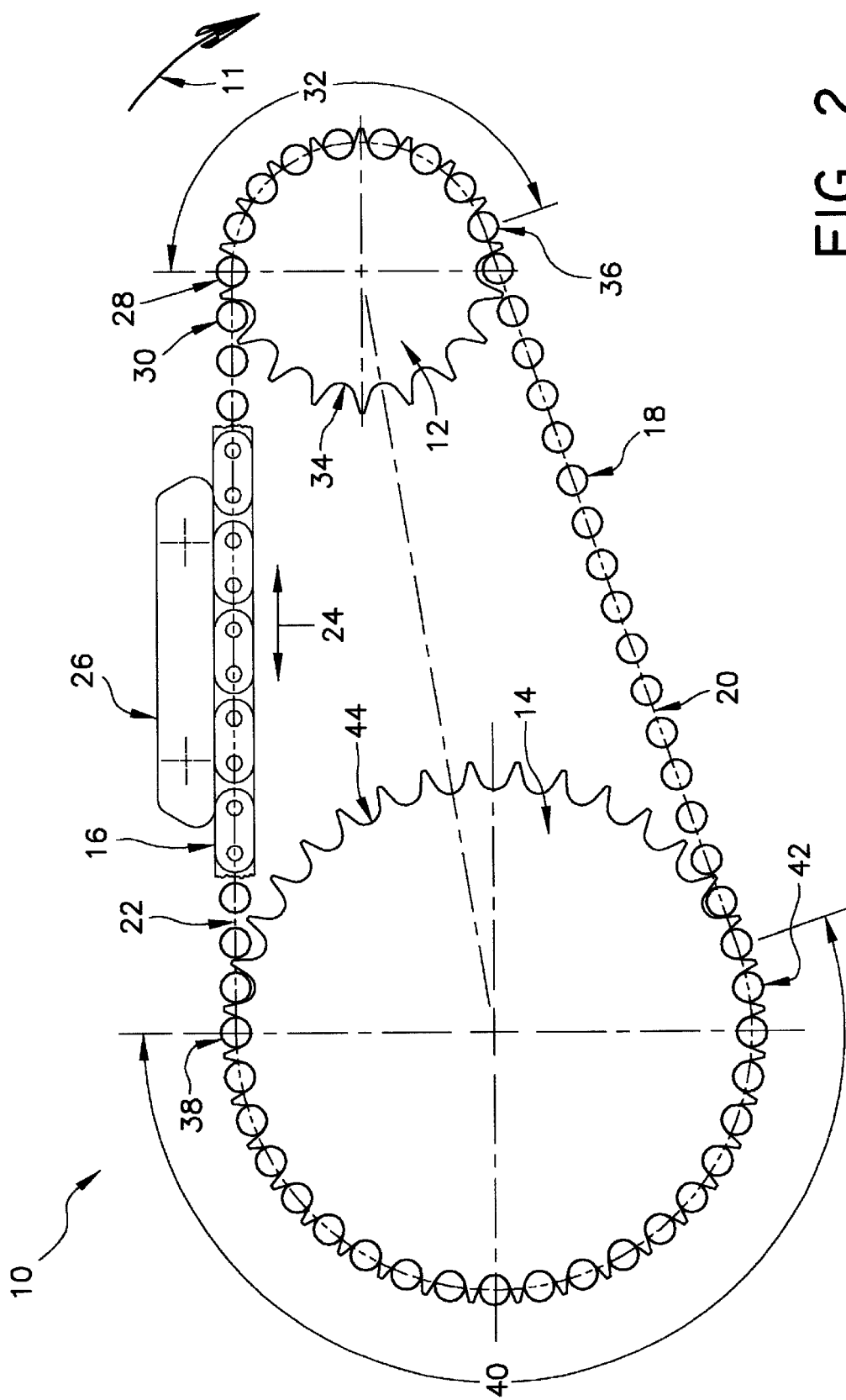
FIG. 2 is an exemplary roller chain drive system having a ISO-606 compliant drive sprocket, driven sprocket, and roller chain.
Figure 3:
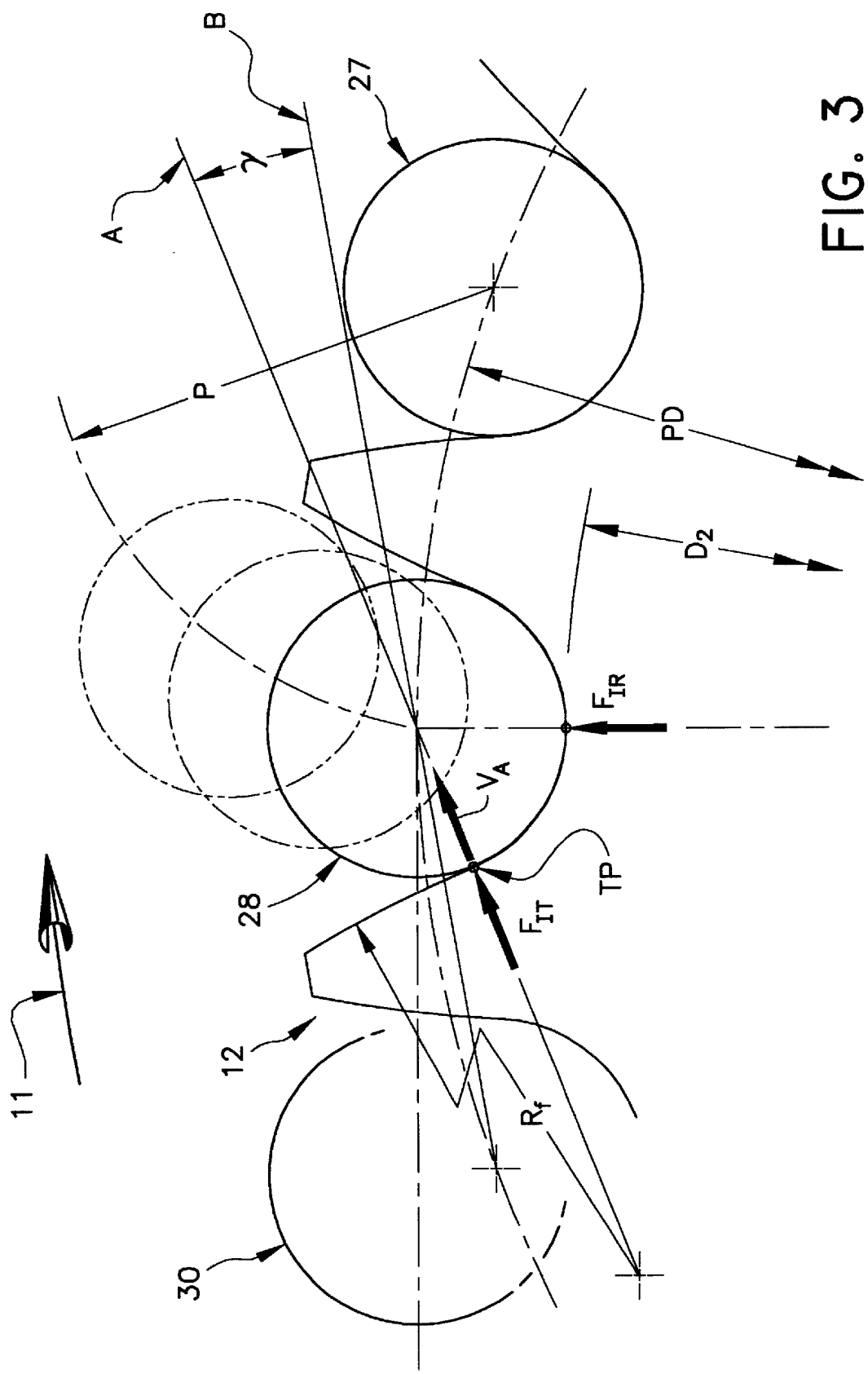
FIG. 3 shows an engagement path (phantom) and a roller (solid) in a driving position as an ISO-606 compliant drive sprocket rotates in a clockwise direction.
Figures 4A, 4B:
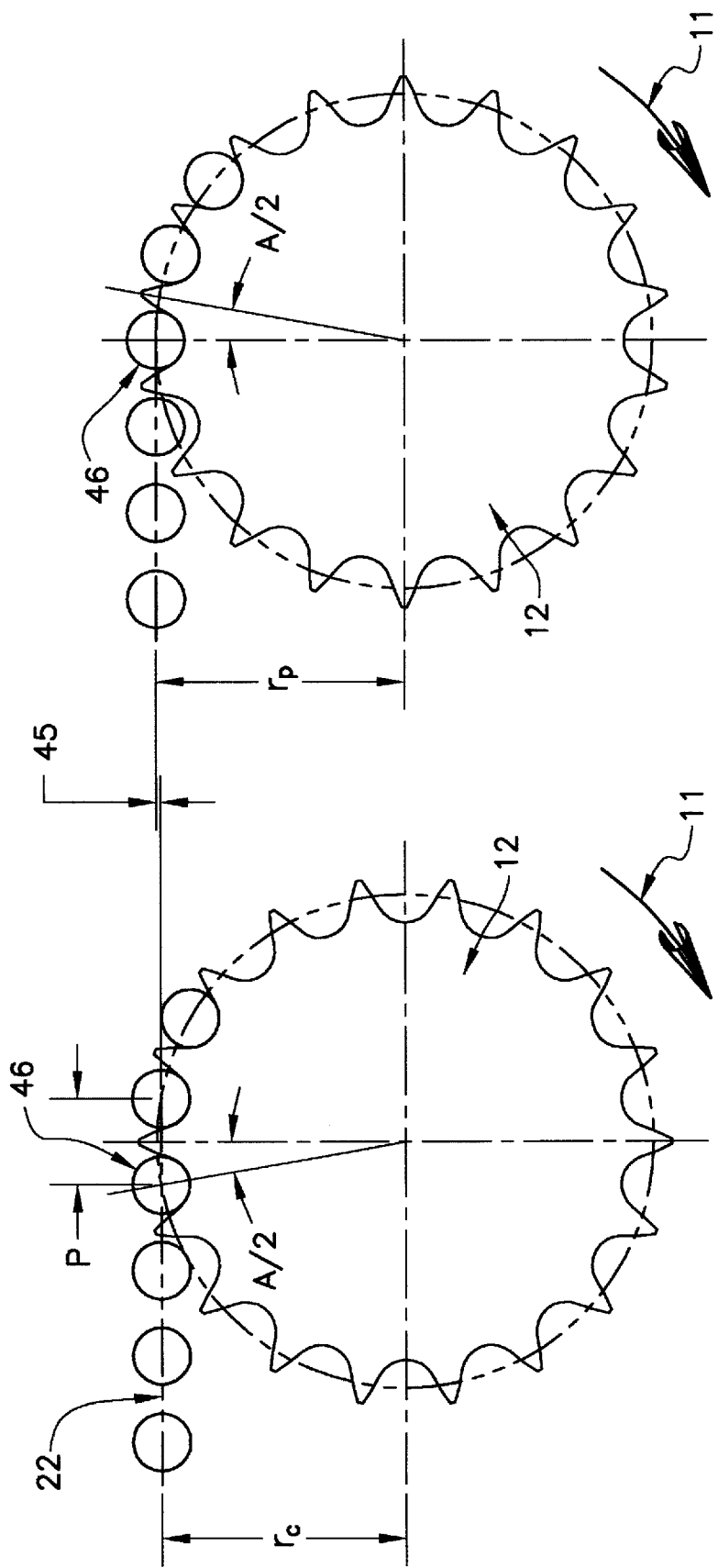
FIG. 4a shows a roller at the onset of meshing with an exemplary 18-tooth sprocket.
FIG. 4b shows the drive sprocket of FIG. 4a rotated in a clockwise direction until the roller is at a 12 o'clock position.
Figure 5:
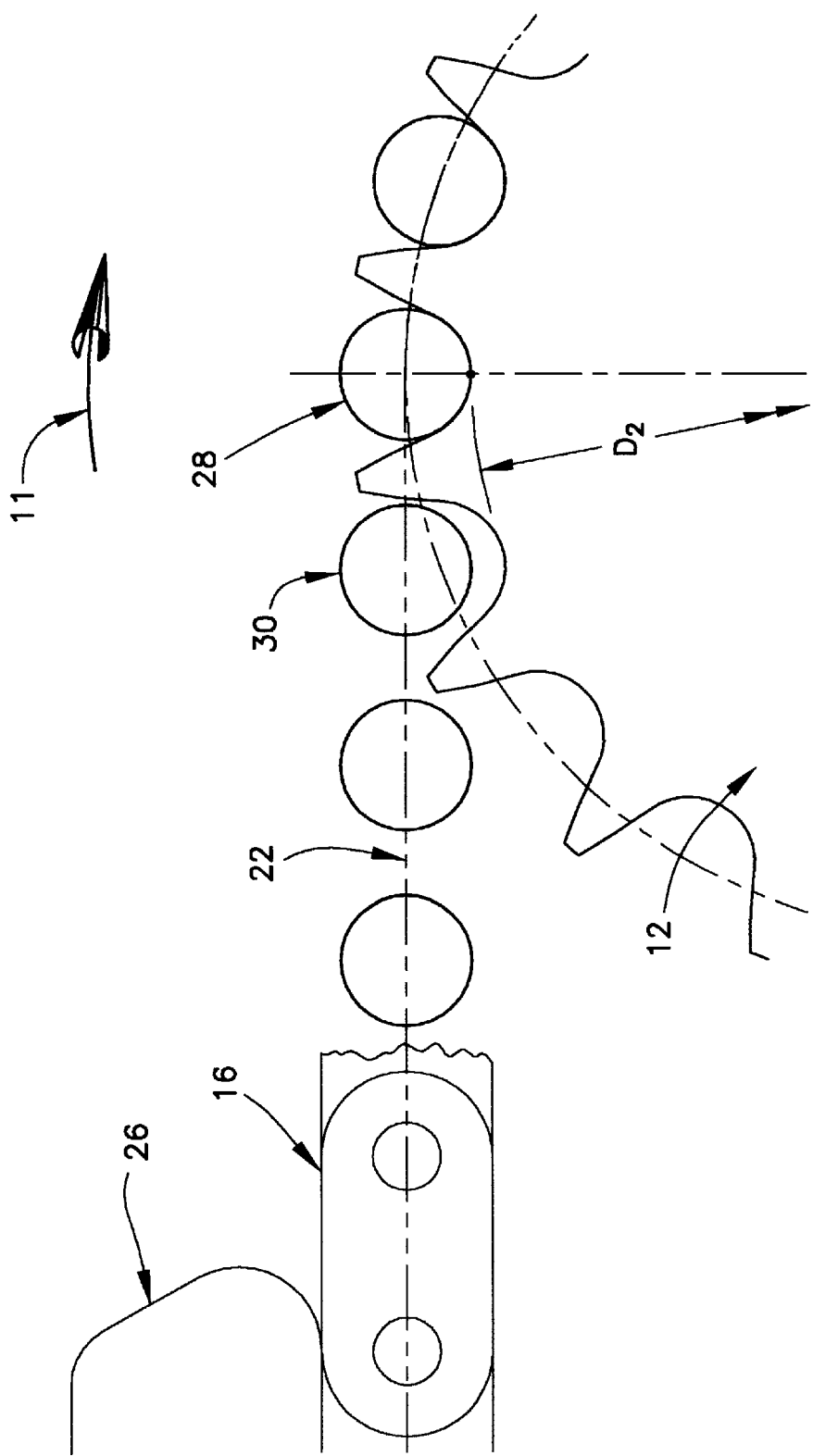
FIG. 5 is an enlarged view of the drive sprocket of FIG. 2 with a roller fully seated in a tooth space and a second roller about to mesh with the drive sprocket.
Figure 6:
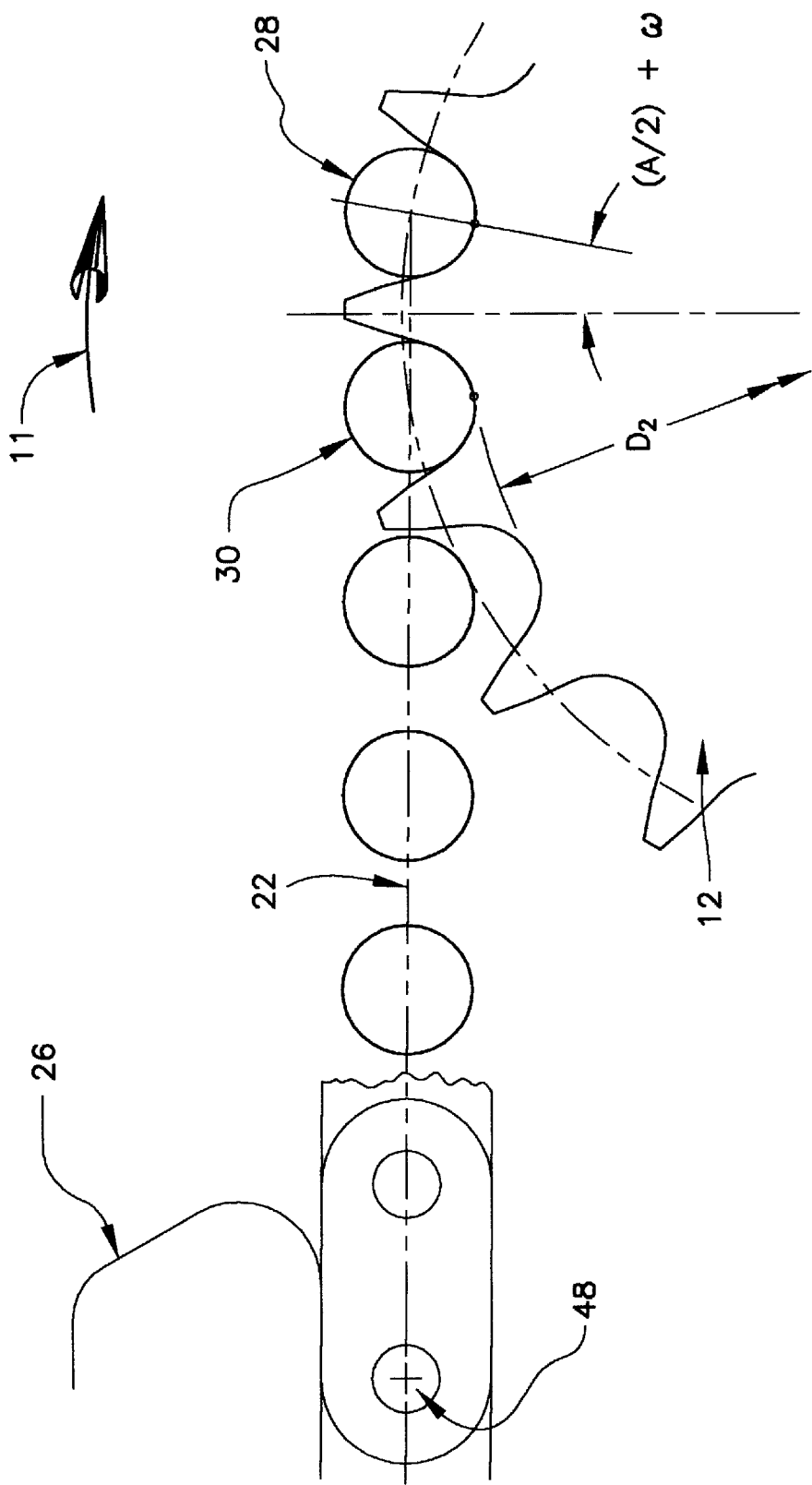
FIG. 6 shows the drive sprocket of FIG. 5 rotated in a clockwise direction until the second roller initially contacts the drive sprocket.
Figure 7:
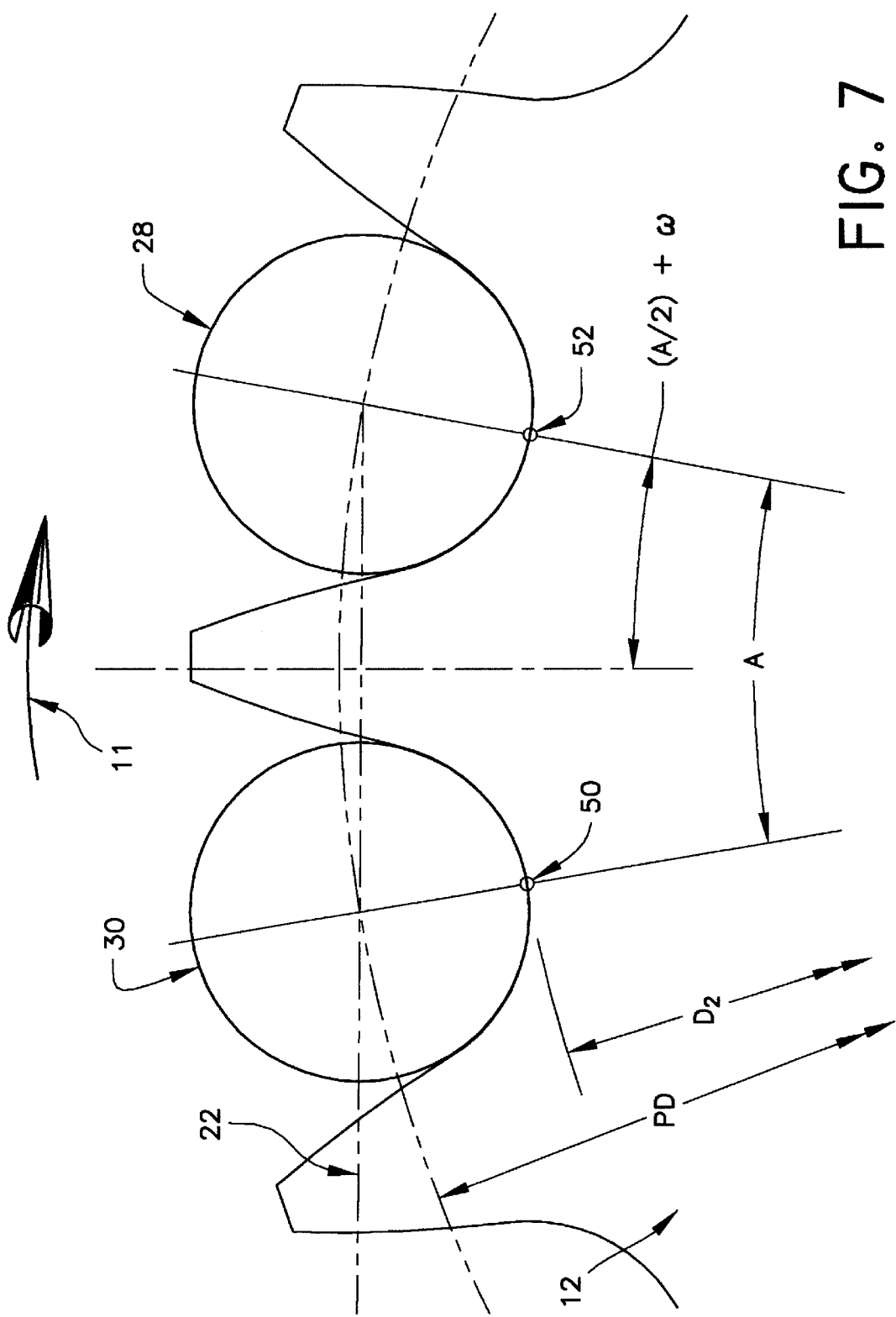
FIG. 7 is an enlarged view of FIG. 6 showing that the second roller initially contacts a root surface (i.e., radial impact) of the drive sprocket, under theoretical conditions.
Figure 11:
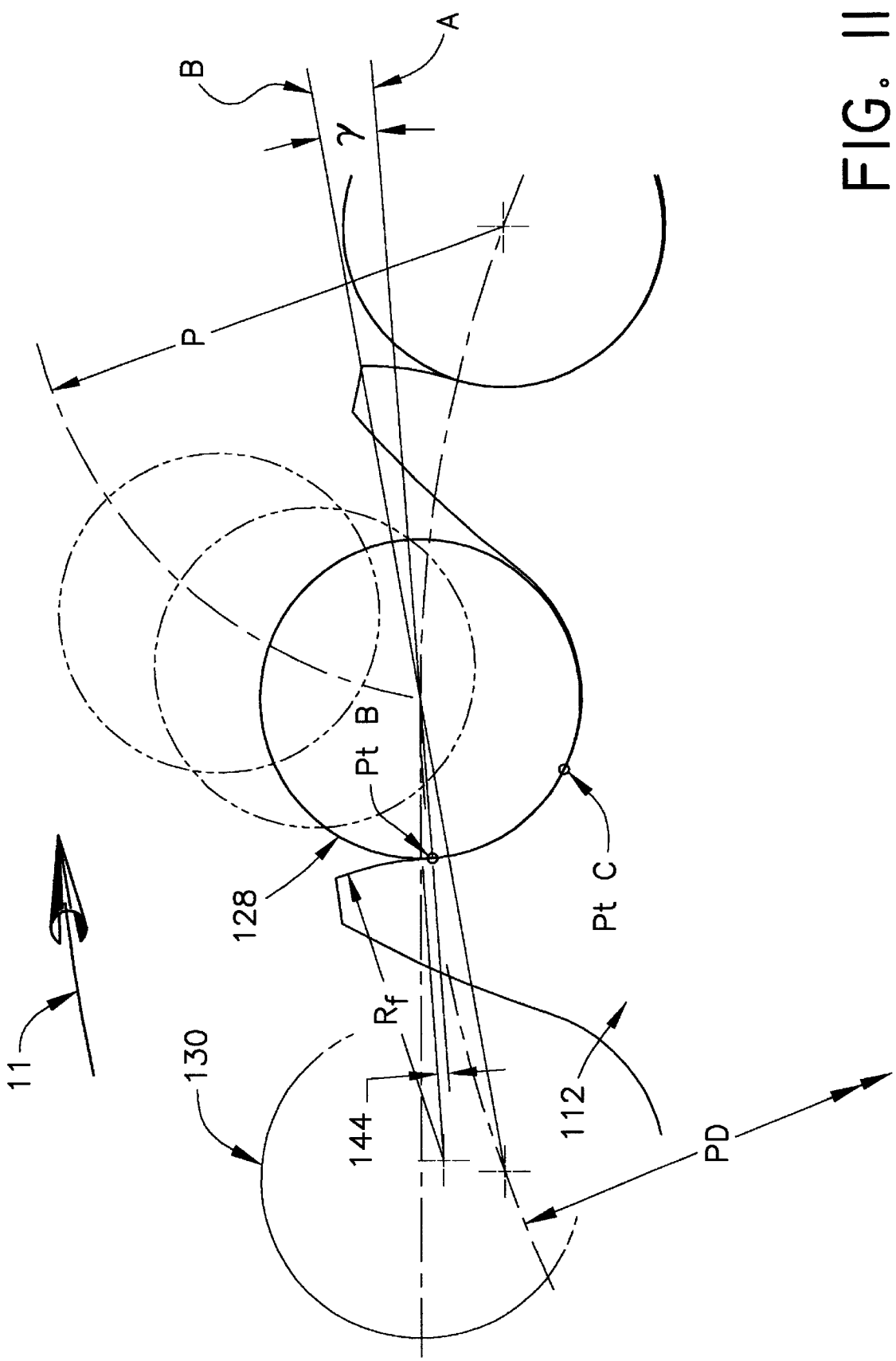
FIG. 11 shows an engagement path (phantom) and the instant of full mesh (solid) of a roller as the drive sprocket of FIG. 8 rotates in a clockwise direction.

In the embodiment being described, roller seating angle β is greater than ISO $\alpha_{max}/2$ at a maximum material condition and β can be adjusted until a desired engaging flank pressure angle γ is achieved. For instance, the roller seating angle β of FIG. 9 provides a pressure angle γ that is less than zero, or a negative value. The negative pressure angle γ is best seen in FIG. 11, as contrasted with the ISO-606 compliant tooth profile of FIG. 3 with a positive pressure angle γ. As shown in FIG. 11, the asymmetrical profile pressure angle γ is defined as the angle between a line A extending from the center of the fully engaged roller 128, when it is contacting the engaging tooth flank at points B and C, through point B, and a line B connecting the centers of the fully seated roller 128, and the center of the next meshing roller 130 as if it were also two-point seated at full mesh in its engaging tooth space. It is believed that a small negative pressure angle for the theoretical chain/sprocket interface beneficially provides a pressure angle γ closer to zero (0) for a "nominal" system or for a system with wear. However, the engaging flank roller seating angle β may be beneficially adjusted so as to provide any engaging flank pressure angle γ having a value less than the minimum ISO-606 pressure angle.

Referring again to FIGS. 9 and 10, a first root radius $R_i$ is tangent to a radially inner end of the flank flat 144, and tangent to a radially outer end of an inclined root surface 146. As best seen in FIG. 10, a maximum root radius $R_i$ must be equal to, or less than, a minimum roller radius $0.5D_1$ to facilitate the fully engaged two-point/line contact at Points B and C. Accordingly, this will define a small clearance 148 (FIG. 10) between the engaging flank 134 at root radius and the roller 128 at full mesh (i.e. two-point/line contact). The flank flat 144 and the inclined root surface 146 necessarily extend inside Points B and C respectively to facilitate the two-point/line roller contact at full engagement for all dimensional tolerance conditions of the roller 128 diameter $D_1$ and the root radius $R_i$. A second root radius $R_i'$ is tangent to a radially inner end of the inclined root surface 146 at line 150. The disengaging flank radius $R_f'$ is tangent to $R_i'$ at a point defined by disengaging flank roller seating angle $\beta'$. The radius $R_f'$ can have a value in the ISO-606 range.

The inclined root surface 146 is a flat surface having a finite length which defines a tooth space clearance (TSC). The tooth space clearance compensates for chain pitch elongation or chain wear by accommodating a specified degree of chain pitch elongation $\Delta P$. In other words, the tooth space clearance TSC enables rollers of a worn chain to be maintained in hard contact with the inclined root surface of the sprocket teeth. In addition, the inclined root surface 146 facilitates reducing the radial reaction force thereby reducing the roller radial impact noise contribution to the overall noise level.

The inclined root surface 146 may be inclined at any angle $\phi$ necessary to satisfy a specific chain drive geometry and chain pitch elongation. As shown in FIG. 9, the inclined root surface angle $\phi$ is measured from a line 152 passing through the center of roller 128 and the sprocket center to a second line 154 which also passes through the center of roller 128 and Point C. The inclined root surface 146 is normal to the line 154, and the inclined root surface extends radially inward to line 150 where it is tangent to $R_i'$. In the embodiment being described, the inclined root surface angle $\phi$ is preferably in the range of about 20° to about 35°.

Figure 12:
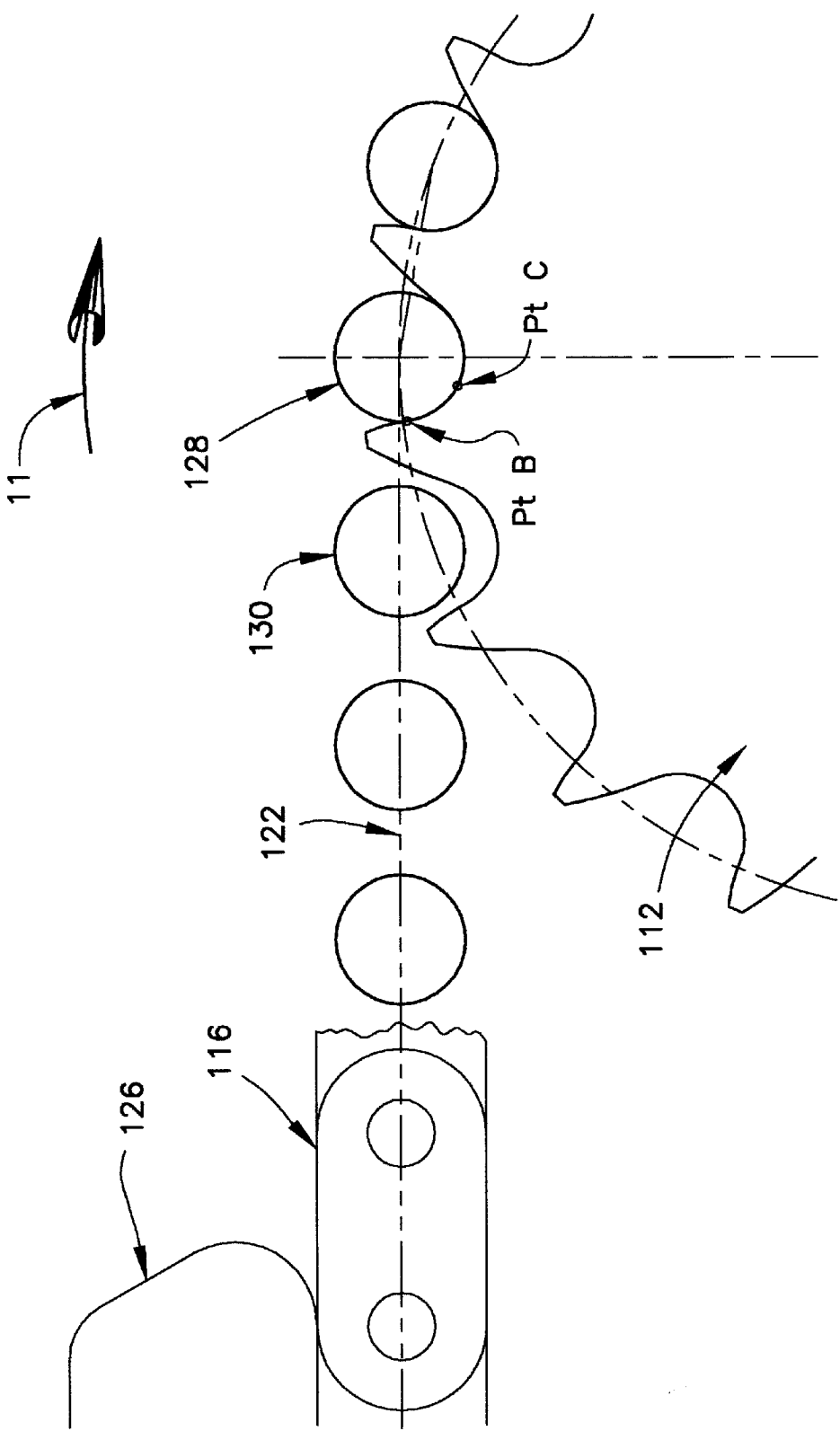
FIG. 12 is an enlarged view of the drive sprocket of FIG. 8 with a first roller fully seated in a tooth space and a second roller as the next roller to be collected from the taut span of the roller chain.

FIG. 12 is an enlarged view of FIG. 8 showing the first roller 128 at full engagement in two-point/line contact across the thickness or width of the sprocket tooth profile, and the second roller 130 as the next roller about to mesh with sprocket 112. As with the ISO-606 compliant drive system 10, the chain guide 126 controls and guides a central portion of the taut strand 122 except for five unsupported link pitches extending between the chain guide 126 and the engaging roller 128 (and except for the unsupported link pitches extending between the driven sprocket and the chain guide). The taut strand 122 is horizontal when roller 128 is at the 12 o'clock position.

Figure 13:
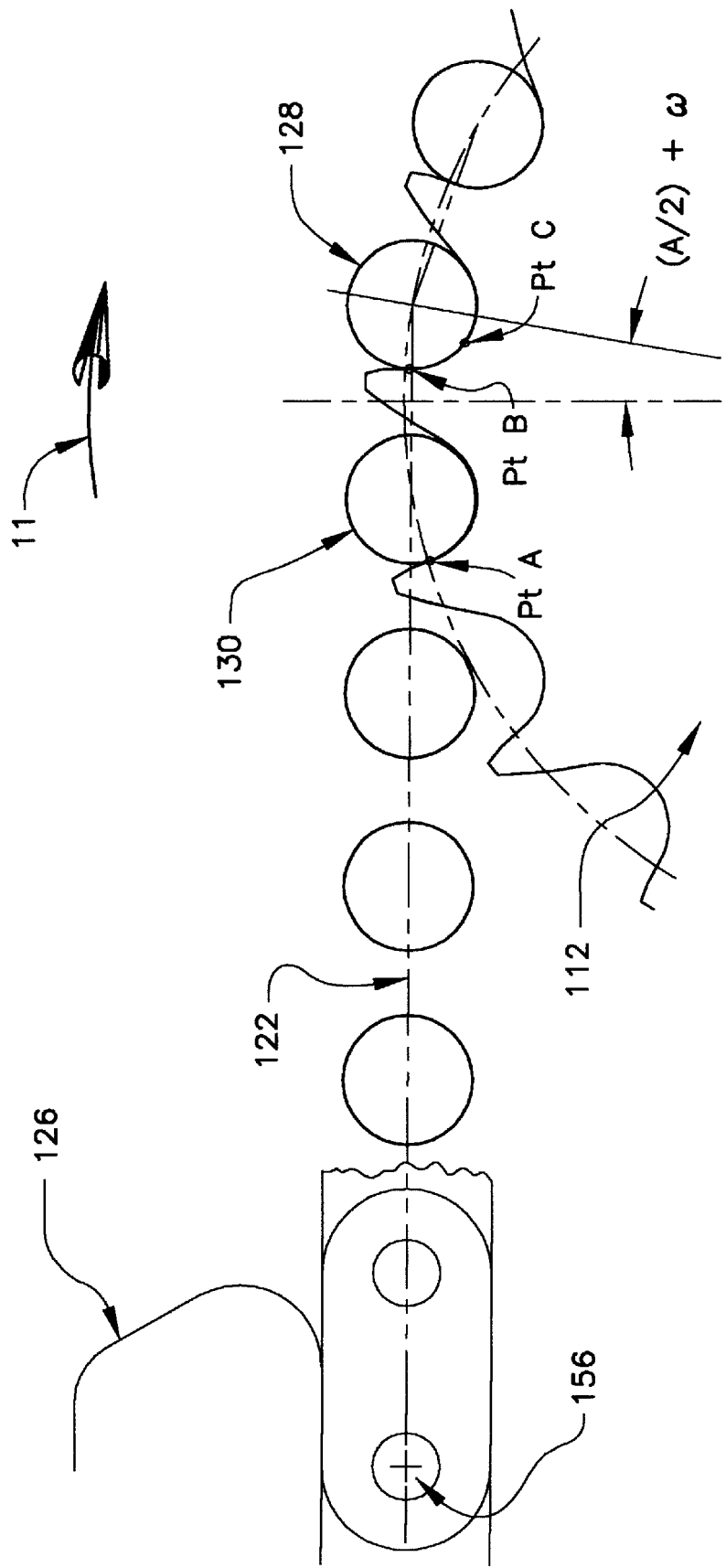
FIG. 13 shows the drive sprocket of FIG. 12 rotated in a clockwise direction until the second roller initially contacts the drive sprocket.

FIG. 13 shows the drive sprocket 112 rotated in a clockwise direction (A/2)+ω, as determined by the instant of sprocket engagement by roller 130. A straight line is assumed for the chain span from roller 128 to a chain pin center 156, about which the unsupported span from pin center 156 to engaging roller 130 is considered to rotate. It should be appreciated that the straight line assumption is valid only in a quasi-static model. The amount of movement (or deviation from the straight line assumption) previously mentioned will be a function of the drive dynamics as well as the drive and sprocket geometry.

The sprocket contact at the onset of mesh for roller 130 occurs earlier than for the ISO-606 counterpart, thereby reducing the amount of chordal rise and, just as importantly, allows the initial contact to beneficially occur at a desired pressure angle γ on the engaging flank at Point A. Furthermore, the radial sprocket contact for roller 130, with its contribution to the overall noise level, does not occur until the sprocket rotation places roller 130 at the 12 o'clock position. This is referred to as staged engagement.

Figure 14:
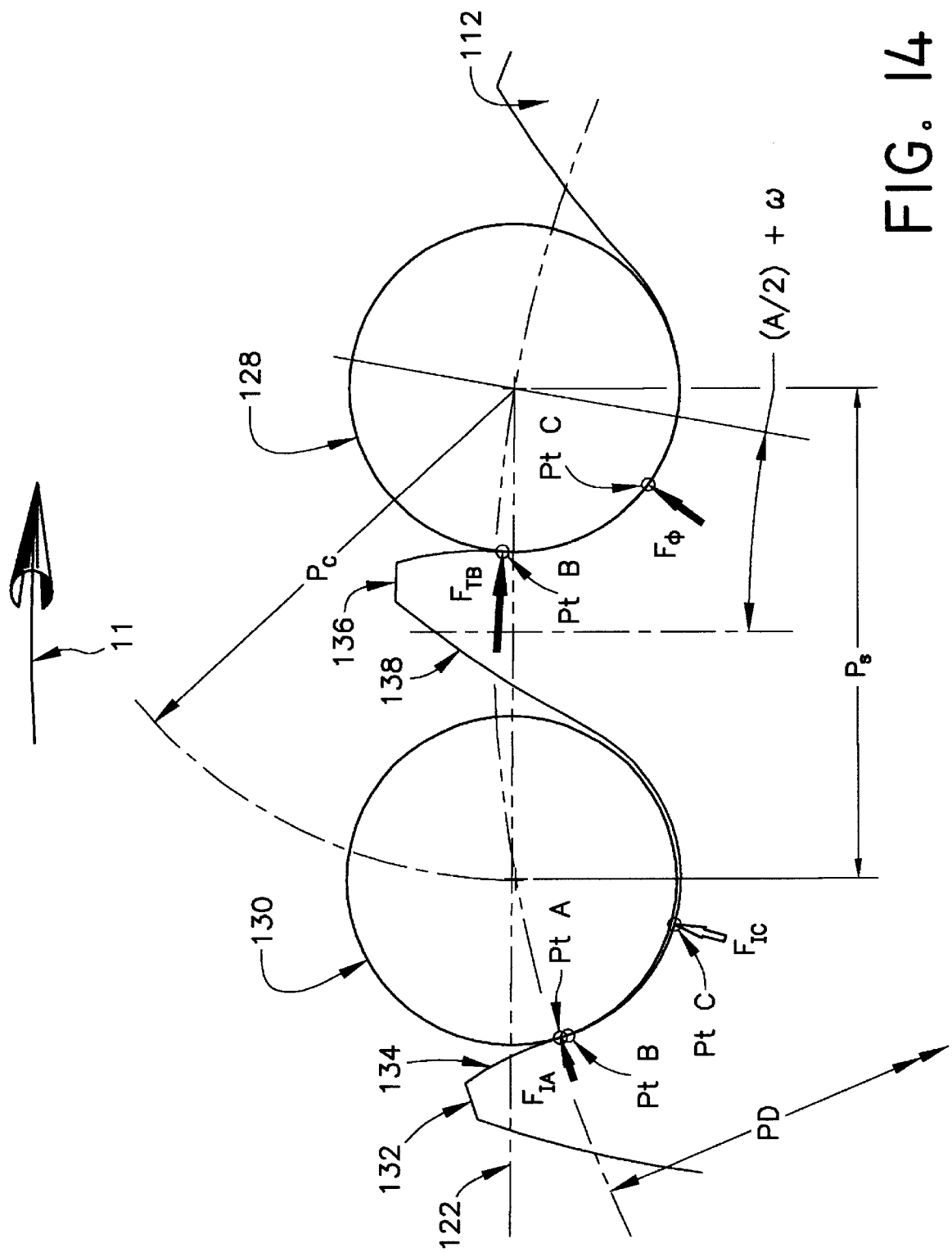
FIG. 14 is an enlarged view of FIG. 13 showing the first roller in two-point contact and second roller at initial tangential contact with the drive sprocket.

FIG. 14, an enlarged view of FIG. 13, more clearly shows the onset of meshing for roller 130. Just prior to the onset of mesh, roller 128 is assumed to carry the entire taut strand load $F_{TB}+F_\phi$, which load is shown as force vector arrows. Actually, the arrows represent reaction forces to the taut strand chain force. At the instant of mesh for roller 130, a tangential impact occurs as shown by impact force vector $F_{IA}$. The tangential impact is not the same as the taut strand chain loading. In particular, impact loading or impact force is related to the impact velocity $V_A$. It is known that impact occurs during a collision between two bodies, resulting in relatively large forces over a comparatively short interval of time. A radial impact force vector $F_{IC}$ is shown only as an outline in that the radial impact does not occur until the sprocket has rotated sufficiently to place roller 130 at a 12 o'clock position.

Figure 14A:
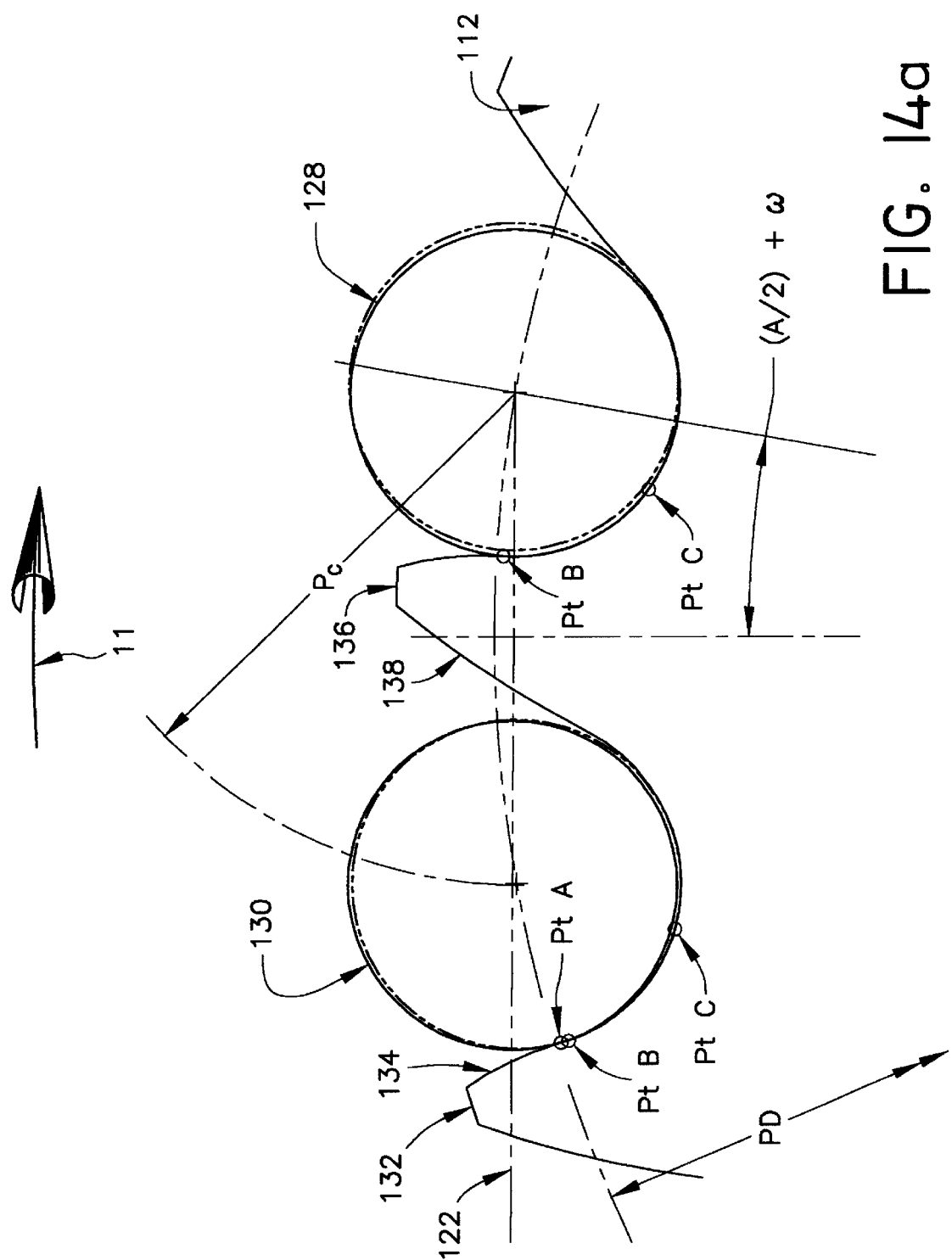
FIG. 14a illustrates the progression of the first and second rollers as the drive sprocket of FIG. 14 is rotated in a clockwise direction.

FIG. 14a shows the same roller positions (solid) for rollers 128 and 130 as shown in FIG. 14, but in addition, shows the roller positions (in phantom) relative to the sprocket profile once roller 130 reaches its two-point/line mesh at the 12 o'clock position. As a result of the pitch mismatch between the chain and sprocket, roller 128 must move to a new position. In particular, as roller 130 moves from initial contact to full mesh, roller 128 progresses forward in its tooth space. Small clearances in the chain joints, however, reduce the amount of forward progression required for roller 128. Also occurring at the onset of meshing is the beginning of the taut strand load transfer from roller 128 to roller 130.

The asymmetrical profile provides for the previously described "staged" meshing. In particular, referring again to FIG. 14, the Point A tangential contact occurs at the onset of mesh, with its related impact force $F_{IA}$. The roller 130 is believed to stay in hard contact with the engaging flank 134 as the sprocket rotation moves the roller into full mesh with its resulting radial contact at Point C.

Figure 14B:
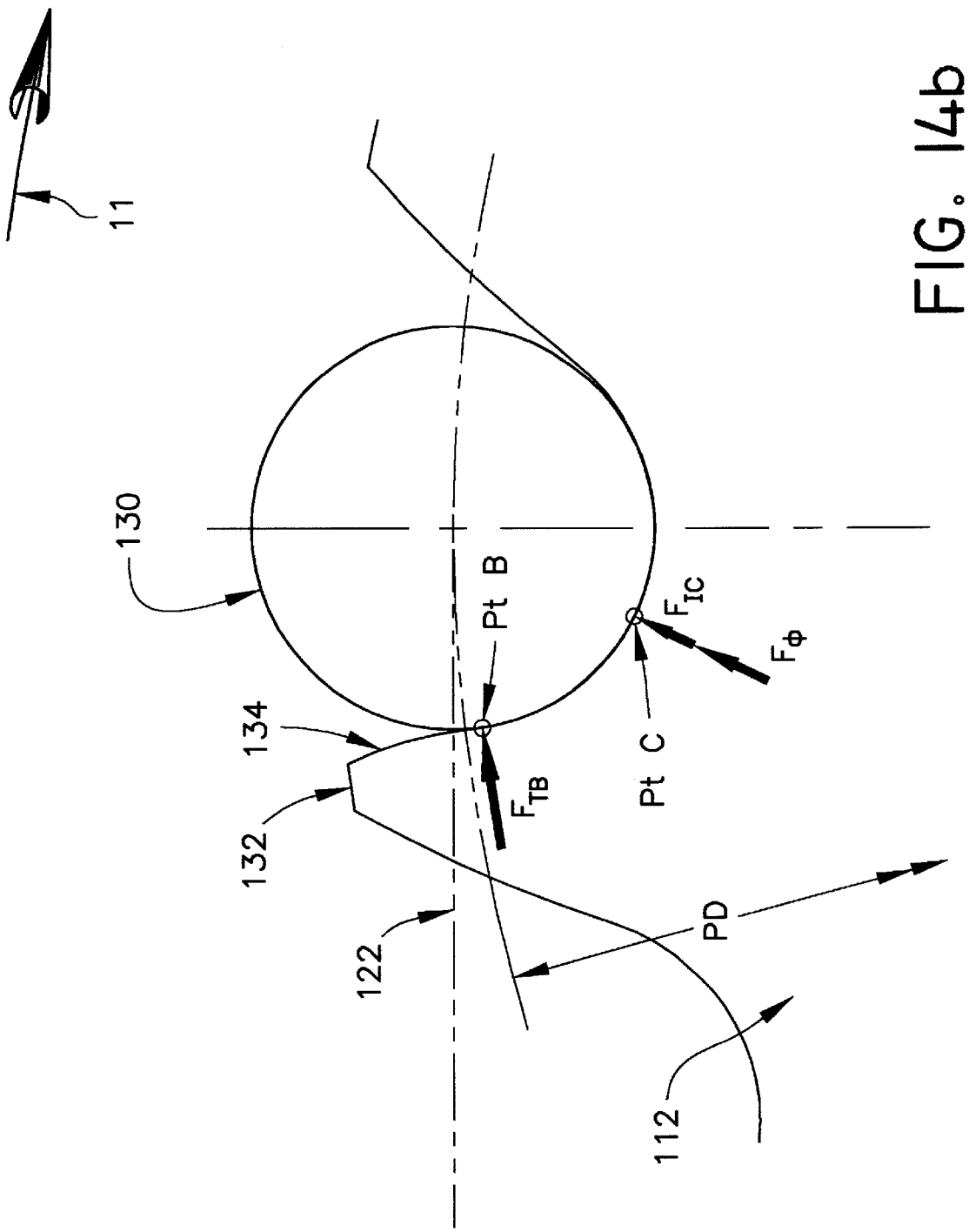
FIG. 14b is an enlarged view of the drive sprocket of FIG. 14 rotated in a clockwise direction to advance the second roller to the instant of full mesh at a 12 o'clock position.

FIG. 14b is an enlarged view of FIG. 14, except that sprocket 112 has been rotated to advance roller 130 to the instant of full mesh at the 12 o'clock position. At this instant of full mesh, the radial impact force $F_{IC}$ occurs and the taut strand load transfer is considered to be complete. At the instant of the radial collision by roller 130 at Point C, with its resultant radial impact force $F_{IC}$, the tangential impact force of $F_{IA}$ has already occurred and is no longer a factor. The time delay ("staged" engagement) between the tangential and radial roller-sprocket collisions effectively spreads the roller-sproket meshing impact energy over a greater time interval, thereby reducing its contribution to the generated noise level at mesh frequency. Additionally, it is believed that the present asymmetrical sprocket tooth profile beneficially permits a more gradual taut strand load transfer from a fully engaged roller 128 to a meshing roller 130 as the meshing roller 130 moves from its Point A initial mesh to its full two-point mesh position.

Referring again to FIG. 14, the chordal rise (and fall) with the present asymmetrical profile is the perpendicular displacement of the center of roller 130 from the taut strand 122 path as it moves from its initial meshing contact Point A to the mesh position presently occupied by roller 128. It is believed that roller 130 will stay in hard contact with the engaging flank 134 as the roller moves from initial tangential contact to full mesh, and accordingly, the chordal rise is reduced as the distance between Points A and B is increased. As shown in FIG. 14, chain pitch $P_C$ is beneficially greater than sprocket 112 chordal pitch $P_S$.

Figure 15:
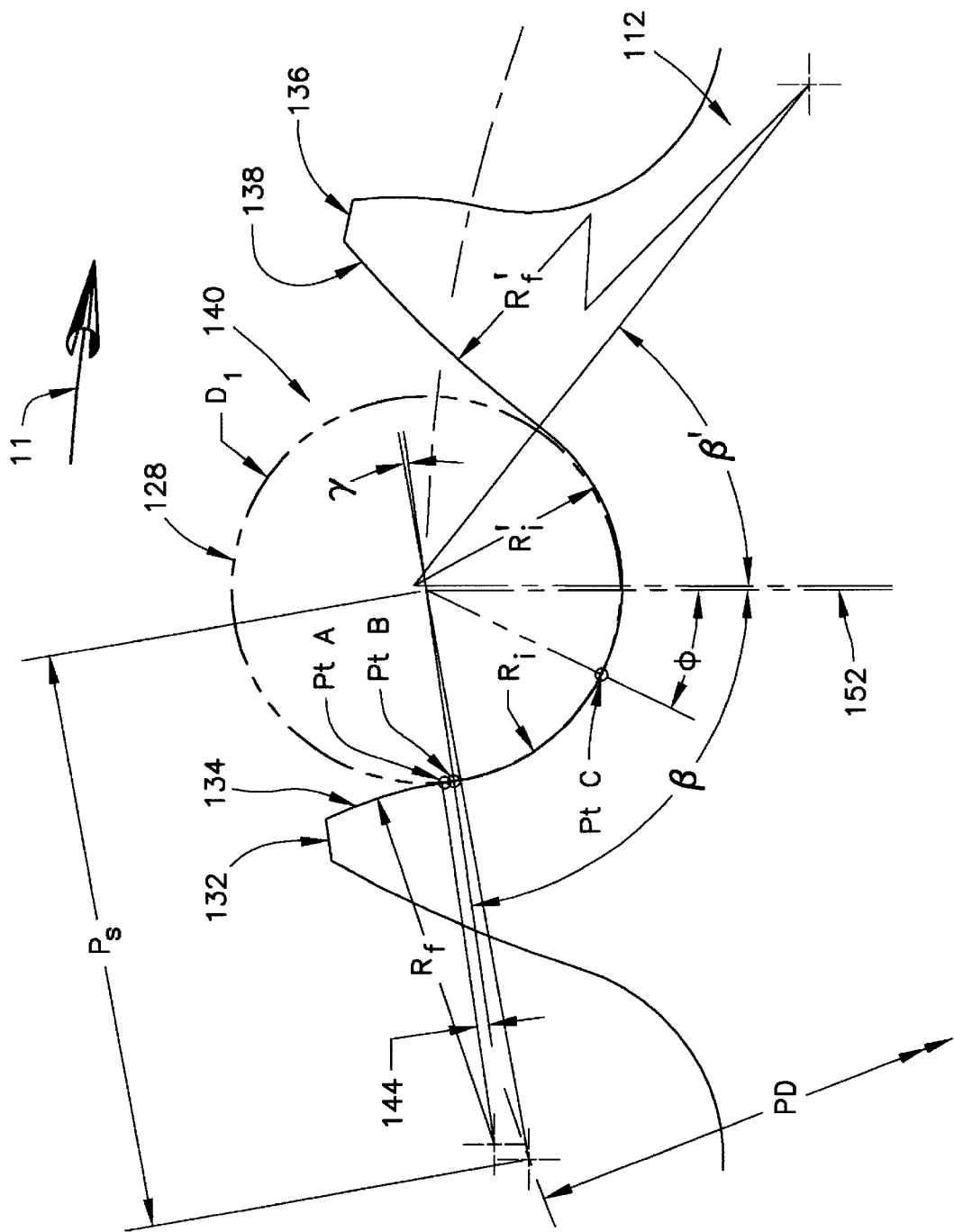
FIG. 15 illustrates a roller chain drive sprocket with an asymmetrical tooth space form in accordance with another embodiment of the present invention.

Referring now to FIG. 15, the length of the inclined root surface 146 (FIG. 10) may be reduced to zero (0), thereby eliminating the inclined root surface 146 and permitting root radius $R_i'$ to be tangent to the root surface and the roller 128 at Point C. That is, $R_i'$ is tangent to a short flat at Point C, and the flat is tangent to $R_i$. If the inclined root surface 146 is eliminated, the engaging flank pressure angle γ would generally be in the range of some positive value to zero, but normally not less than zero. The reason is that a negative γ requires chordal pitch reduction so that the roller can exit the sprocket wrap 60 (FIG. 16) without interfering with $R_f$.

Figure 16:
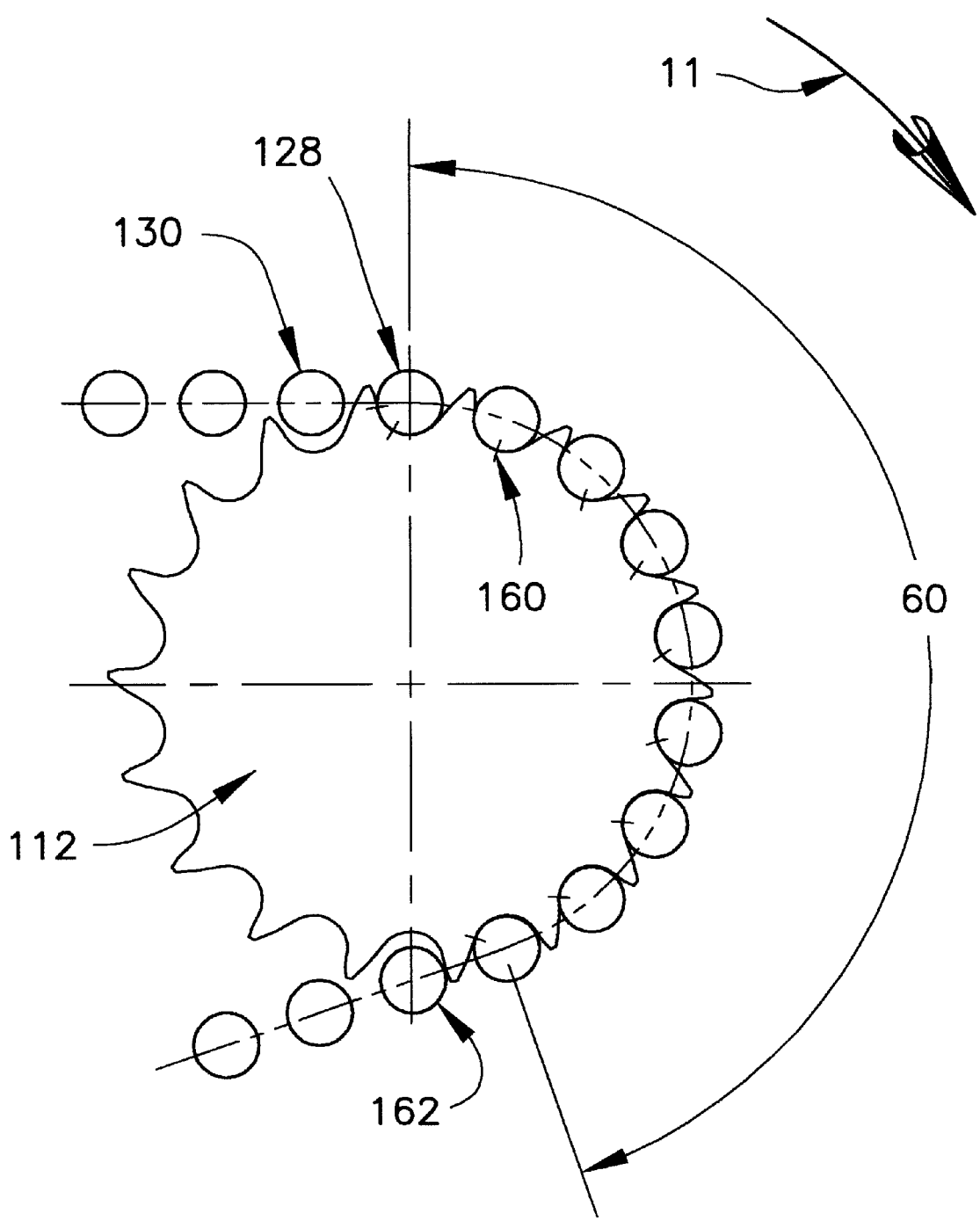
FIG. 16 is an enlarged partial view of FIG. 8, showing the contact progression as the rollers travel around the drive sprocket wrap.

FIG. 16 shows the roller contact to the sprocket 112 profile for all the rollers in the wrap 60. Roller 128 is in full two-point mesh as shown. Line 160 shows the contact point for each of the rollers, as well as the contact progression as the rollers travel around the wrap. The inherent pitch mismatch between the sprocket and roller chain causes the rollers to climb up the coast side flank as the rollers progress around the sprocket wrap. With the addition of appreciable chordal pitch reduction, the extent to which the rollers climb up the coast side flank in increased.

Figure 17:
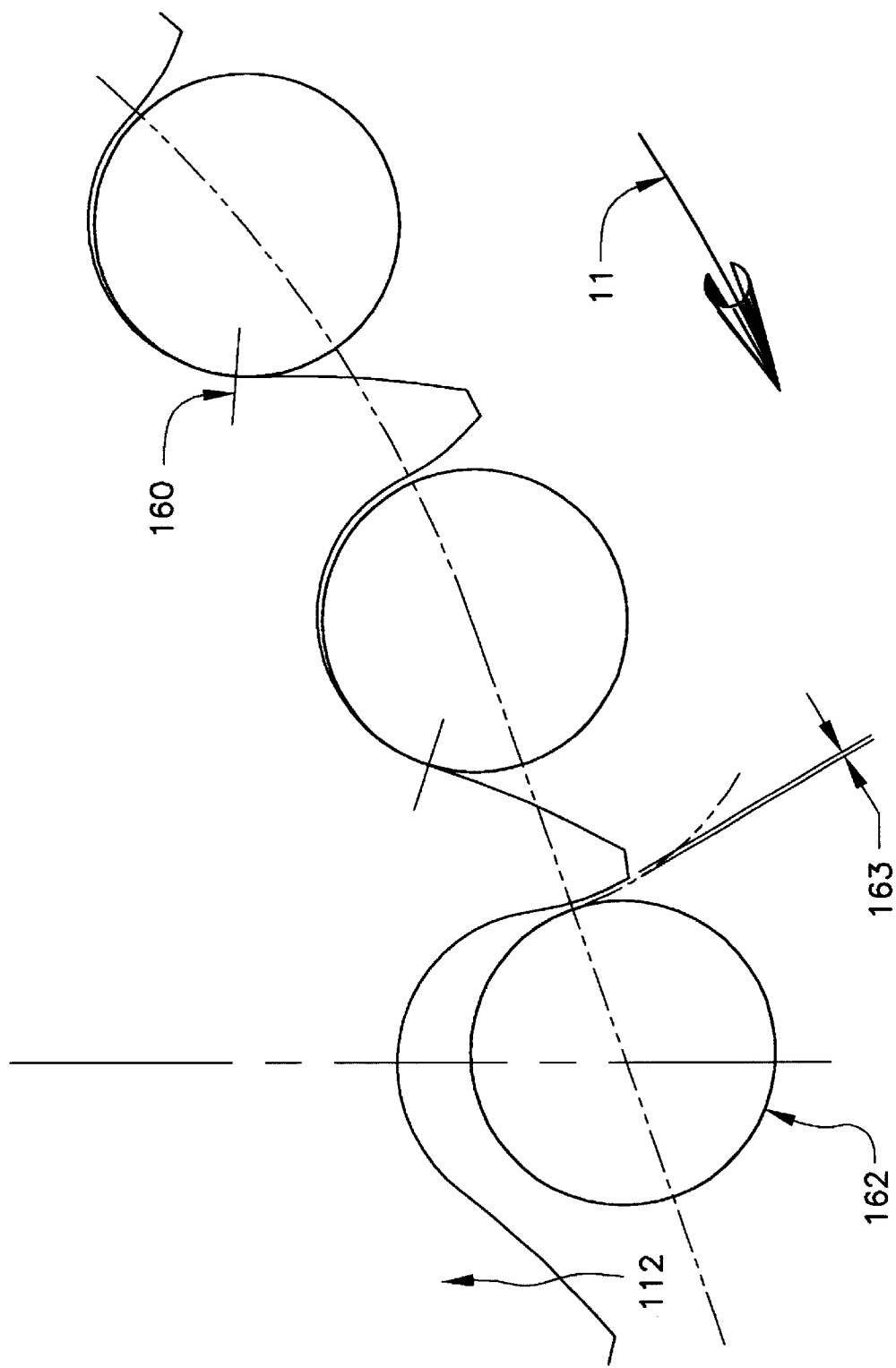
FIG. 17 is an enlarged view of a roller exiting a sprocket wrap of the sprocket of FIG. 16.

It is important to note that chordal pitch reduction is required when the pressure angle γ has a negative value. Otherwise, as shown in FIGS. 16 and 17, roller 162 would interfere with the engaging flank (with a maximum material sprocket and a theoretical pitch [shortest] chain) as it exits the wrap 60 back into the span. That is, chordal pitch reduction permits the roller 162 to exit the wrap 60 with a clearance 163 at the engaging flank. Also, the reduced chordal pitch assists the staged mesh as previously mentioned. FIG. 16, showing the roller contact progression in the wrap 60, serves also to show why the shallow β angle and tooth space clearance TSC helps maintain "hard" roller-sprocket contact for the rollers in the wrap.

In addition, the disengaging flank roller seating angle β (FIG. 9) may be adjusted to have a maximum value which is equal to $\alpha_{min}/2$ or even less. This reduced roller seating angle β' promotes faster separation when the roller leaves the sprocket and enters the span. This reduced angle β' also allows for the roller in a worn chain to ride up the coast flank surface to a less severe angle as the roller moves around the sprocket in the wrap. Accordingly, chordal pitch reduction, if used in this embodiment, should be a small value.

It is contemplated that the above-described asymmetrical tooth profile features can be altered without substantially deviating from the chain and sprocket meshing kinematics that produce the noise reduction advantages of the present invention. For example, the engaging asymmetrical flank profile could be approximated by an involute form, and the disengaging asymmetrical flank profile could be approximated by a different involute form. Slight changes to the asymmetrical tooth profiles may be made for manufacturing and/or quality control reasons, or simply to improve part dimensioning. These changes are within the scope of the invention as disclosed herein.

Figure 18:
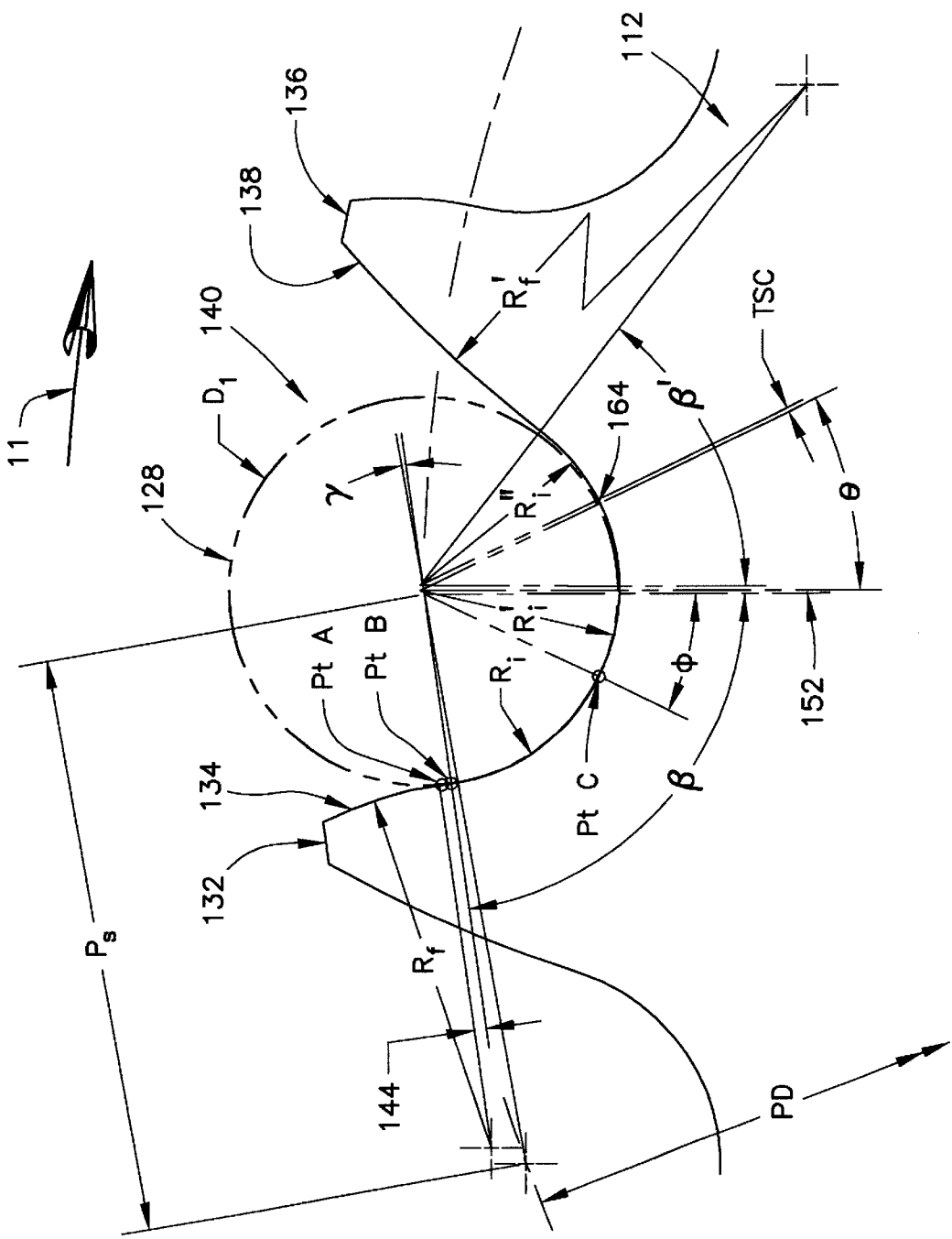
FIG. 18 illustrates a roller chain sprocket with an asymmetrical tooth space form in accordance with another embodiment of the present invention.

In a further embodiment, the engaging flank inclined root surface 146 (FIG. 9) may be replaced with a coast flank inclined root surface 164 as shown in FIG. 18. The coast flank inclined root surface 164 provides tooth space clearance (TSC) in the same manner as described above with regard to the inclined root surface 146. In addition, the disengaging flank inclined root surface 164 beneficially moves the roller to a preferred radially outward position as the chain wears.

Figure 19:
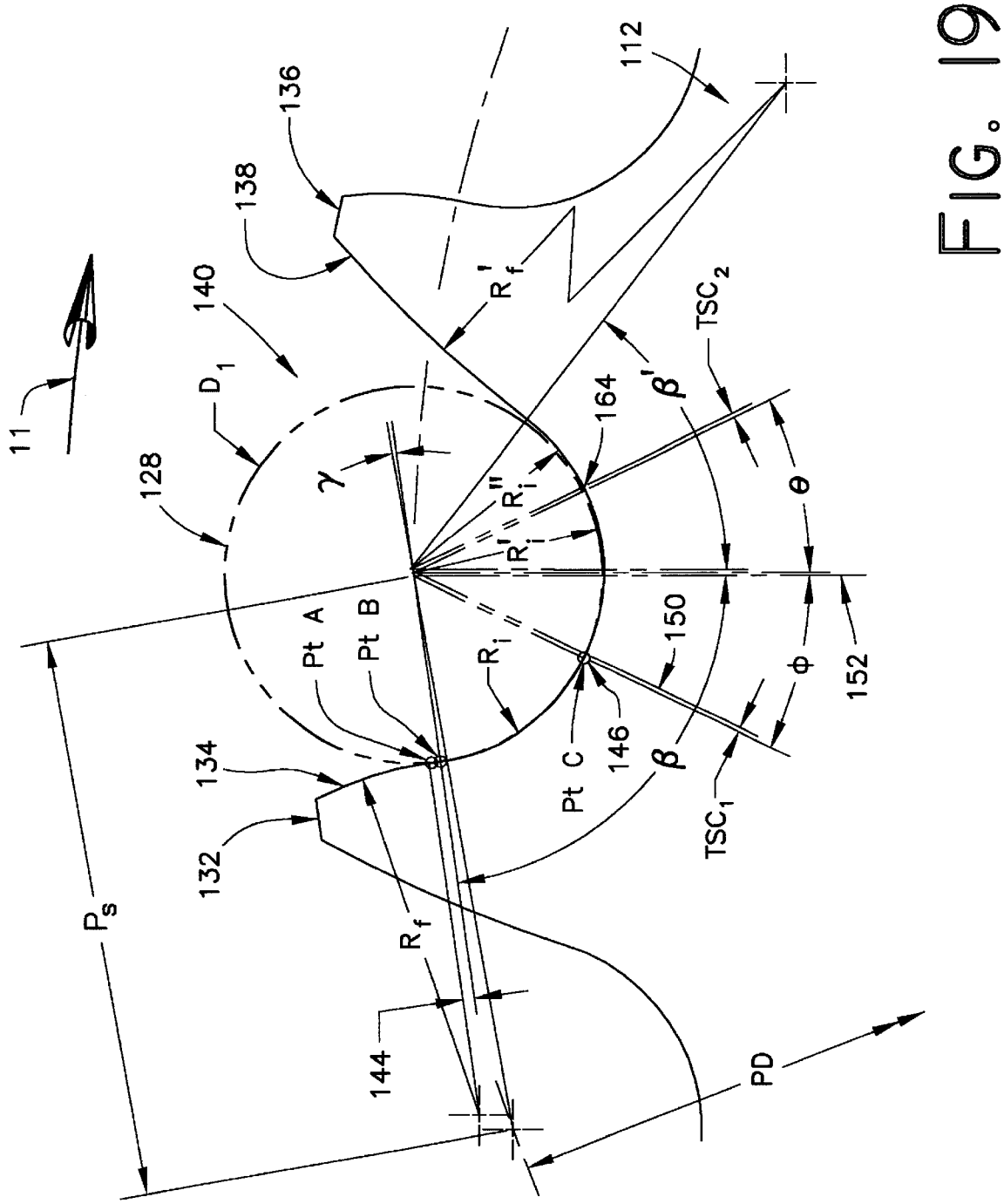
FIG. 19 illustrates a roller chain sprocket with an asymmetrical tooth space form in accordance with a further embodiment of the present invention.

Alternatively, the coast flank inclined root surface 164 may be included with the engaging flank inclined root surface 146 as shown in FIG. 19. The engaging flank and coast flank inclined root surfaces 146, 164 cooperate to provide tooth space clearance (TSC) in the same manner as previously described.

Figure 20:
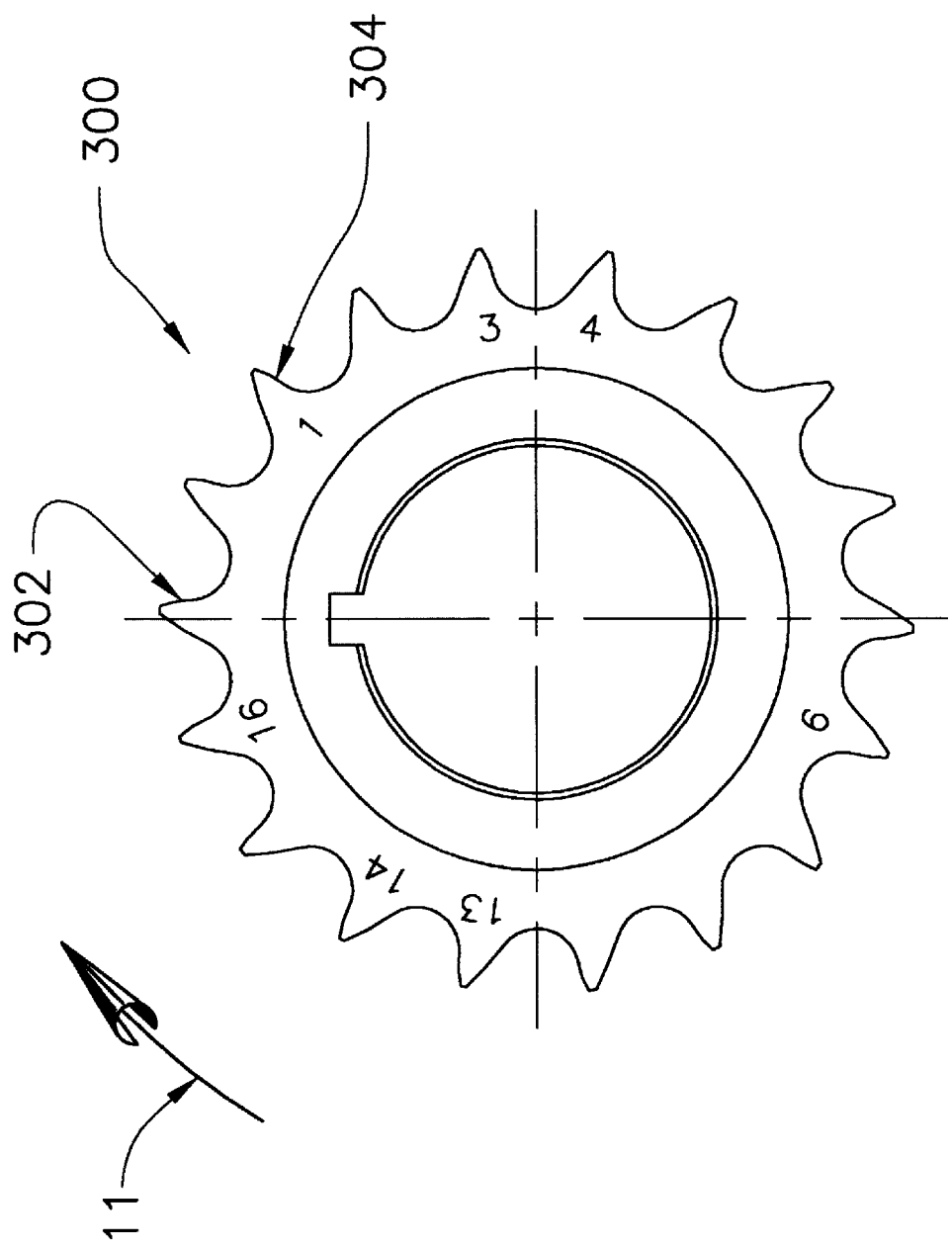
FIG. 20 is a front view of an exemplary random-engagement roller chain sprocket which incorporates the features of the present invention therein.

Referring now to FIG. 20, any one of the above-described asymmetrical tooth profile embodiments of FIGS. 9, 15, 18, and 19 may be incorporated into a random-engagement roller chain sprocket 300. The sprocket 300 is shown as an 18-tooth sprocket. However, the sprocket 300 may have more or less teeth, as desired. The sprocket 300 includes a first group of arbitrarily positioned sprocket teeth 302 each having a profile which incorporates the flank flat 144 shown in FIGS. 9, 15, 18 and 19. Further, the sprocket teeth 302 can incorporate none, one or both inclined root surfaces 146, 164 as shown in FIGS. 9, 15, 18 and 19. The remaining sprocket teeth 304 (sprocket teeth 1, 3, 4, 9, 13, 14, and 16) are randomly positioned around the sprocket and incorporate a tooth profile different from that of the first group of sprocket teeth 302. As described further bdlow, the first and second groups of sprocket teeth 302, 304 cooperate to reduce chain drive system noise levels below a noise level which either tooth profile used alone would produce.

Figure 21A:
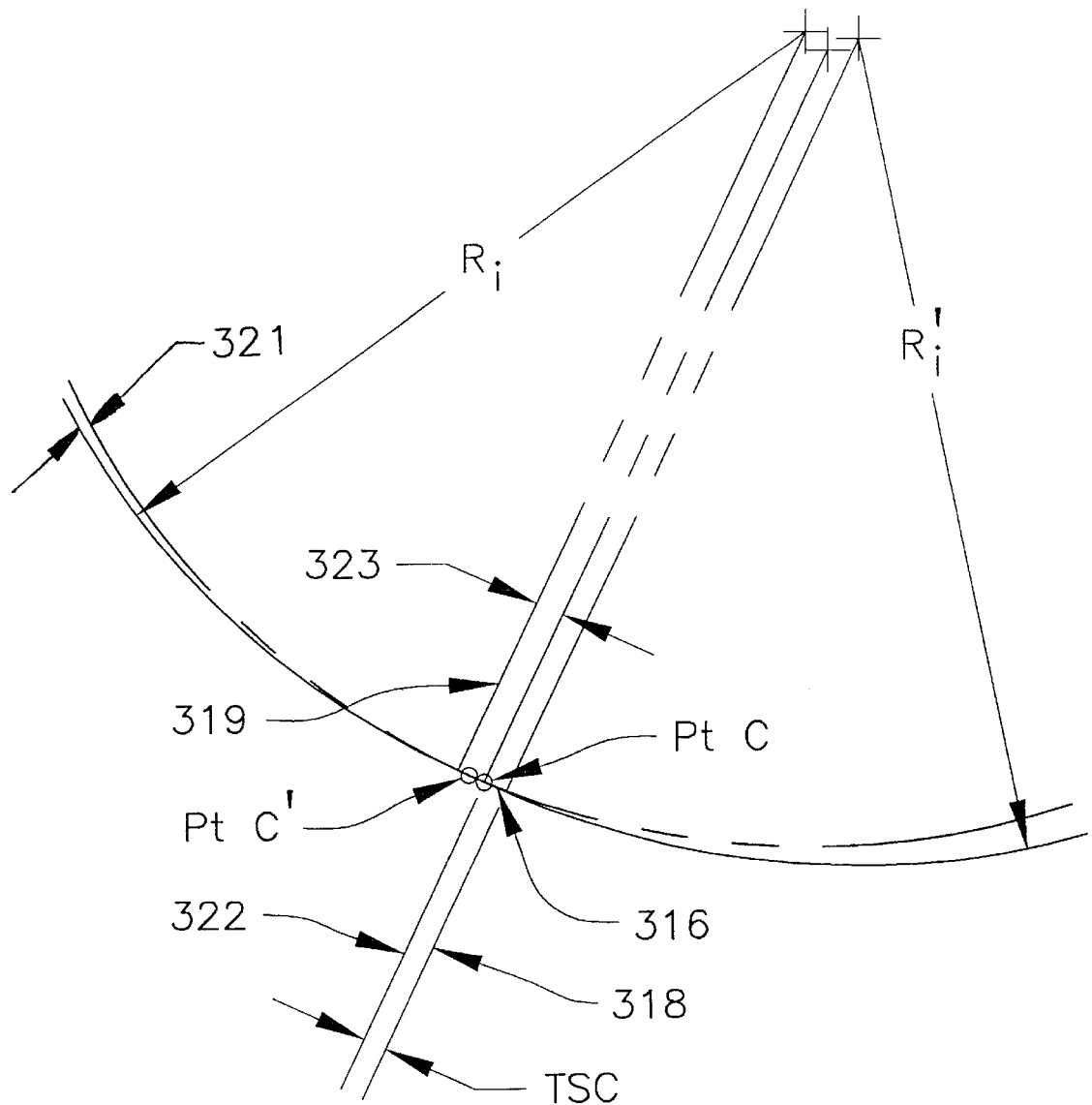
FIG. 21a is an enlarged view of the sprocket of FIG. 21 showing an inclined root surface thereof which provides flank relief and tooth space clearance.

FIG. 21 illustrates an exemplary tooth profile for one of the sprocket teeth 304. An engaging flank 306 and a coast or disengaging flank 308 of an adjacent tooth cooperate to define a tooth space 310 having a root surface 311. The tooth space 310 receives an engaging roller 314 (shown in phantom). The engaging roller 314 has a roller diameter $D_1$ and is shown fully seated with single point (line) contact within the tooth space 310. As best seen in FIG. 21a, the engaging roller 314 does not contact the engaging flank 306 at the onset of meshing, moving instead directly from the span to full-mesh root contact on a inclined root surface 316 at a contact point C' located radially outward of contact point C in a direction toward the engaging flank 306. Contact point C' is a roller/tooth contact line that extends axially along each sprocket tooth surface (i.e., in a direction orthogonal to the plane of the drawings). Thus, a clearance 318 is defined between the roller 314 and the engaging flank 306.

As shown in FIGS. 21 and 21a, the first or engaging root radius $R_i$ is tangent to inclined root surface 316 at line 319, and also tangent to $R_f$ as defined by angle β. Angle β has no functional requirements specific to the onset of roller meshing since roller/flank contact will not take place with tooth profile 304. It should be noted that Ri can be equal to the ISO-606 root radius for tooth profile 304.

The length of the inclined root surface from point C to its radially outer end at line 319 is determined by the amount of flank offset required to ensure that the roller will not have engaging flank contact for any expected chain pitch elongation (wear) throughout its design life. In the preferred embodiment, the flank offset 323 is in the range of about 0.025 to about 0.13 mm. The flank offset 323 is an extension of inclined root surface 316 which provides tooth space clearance (TSC) in the same manner described above with regard to inclined root surface 146.

As previously mentioned, tooth space clearance compensates for chain pitch elongation or chain wear by accommodating a specified degree of chain pitch elongation. In other words, the tooth space clearance TSC enables rollers of a worn chain to be maintained in hard contact with the inclined root surface of the sprocket teeth. In addition, the inclined root surface 316 facilitates reducing the radial reaction force thereby reducing the roller radial impact noise contribution to the overall noise level.

The inclined root surface 316 may be inclined at any angle φ necessary to satisfy a specific chain drive geometry and chain pitch elongation. The inclined root surface angle φ is measured from a line 320 passing through the center of roller 314 and the sprocket center to a second line 322 which also passes through the center of roller 314 and through contact point C. The inclined root surface 316 is normal to the line 322, and the inclined root surface extends radially inward to line 318 where it is tangent to $R_i'$. In the embodiment being described, the inclined root surface angle φ is preferably in the range of about 20° to about 35°.

Figure 22:
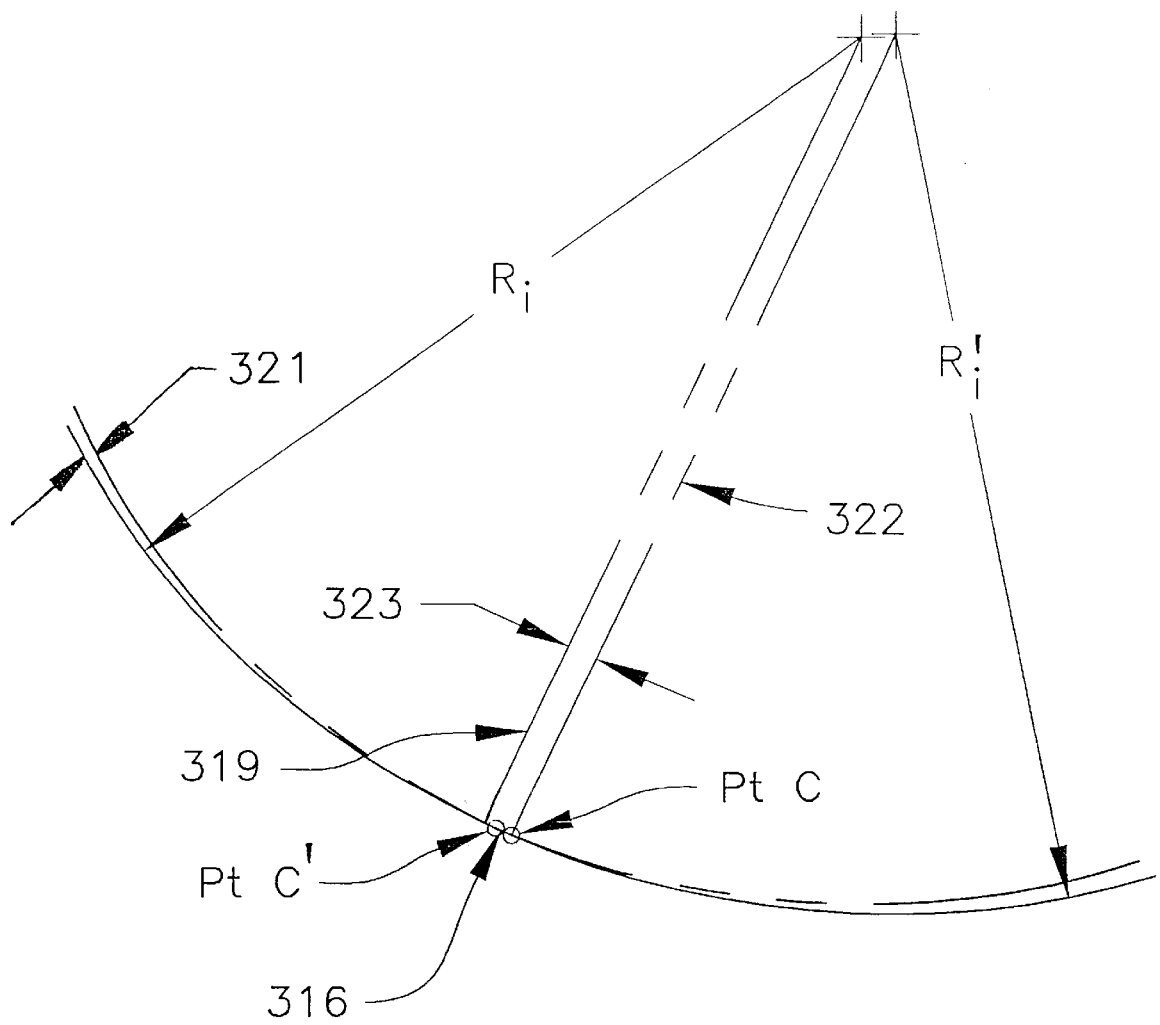
FIG. 22 is another embodiment of the inclined root surface of FIG. 21 which only provides flank relief.

FIG. 22 shows another embodiment of the tooth profile 304 where no tooth space clearance TSC is provided. That is, the flat surface portion of the inclined root surface from line 318 to line 322 is not present. Thus, the profile of the tooth 304 from point C to the outside or tip diameter at the disengaging side of the tooth space is substantially identical to the tooth profile shown in FIG. 15. The remaining flat surface portion 323 of the inclined root surface 316 from line 322 to line 319 functions only to provide the engaging flank offset as described above.

It should be appreciated that the portion of the engaging flank inclined root surface from line 318 to line 322 may be replaced with a coast flank inclined root surface 164 as in FIG. 18. That is, the tooth profile 304 may be substantially identical to the tooth profile for sprocket 112 shown in FIG. 18 from contact point C to the outer diameter of the coast flank 138. The coast flank inclined root surface 164 provides tooth space clearance (TSC) in the same manner as the inclined root surface 316. In addition, the coast flank inclined root surface beneficially moves the roller to a preferred radially outward position as the chain wears. Alternatively, the coast flank inclined root surface 164 may be included with the engaging flank inclined root surface 316 in the same manner as shown in FIG. 19 (where the inclined surface 164 is included with the inclined surface 146). Thus, the tooth profile 304 may also be substantially identical to the tooth profile for sprocket 112 shown in FIG. 19 from contact point C to the outer diameter of the coast flank 138.

Pitch mismatch is inherent in a chain/sprocket interface except at one condition—the theoretical condition which is defined as a chain at its shortest pitch (shortest being theoretical pitch) and a maximum material sprocket. This theoretical condition therefore defines one limit (zero, or no pitch mismatch) of the tolerance range of the pitch mismatch relationship of chain and sprocket. The other limit is defined when a longest "as built" chain is used with a sprocket at minimum material conditions—or in other words, a sprocket having a minimum profile. This limit produces the greatest amount of pitch mismatch. The pitch mismatch range is therefore determined by the part feature tolerances.

Additional pitch mismatch may be introduced to facilitate a greater time delay, or "staged" meshing, between the initial tangential contact at point A and the full seated contact at points B and C for tooth profile 302. It should be appreciated that staged contact for profile 302 is enhanced due to the flank flat 144 which causes initial contact to occur higher up on the engaging flank. This will result in reduced mesh frequency noise levels because the point and rhythm of the initial roller-to-sprocket contacts are altered for each tooth profile 302, 304 since profile 304 does not have a tangential contact.

The sprocket chordal pitch is necessarily shorter than the chain pitch to facilitate the "staged" roller-tooth contact. In addition, chordal pitch reduction also provides roller-to-flank clearance as the roller exits the sprocket wrap back into the strand. Added chordal pitch reduction, when used, is preferably in the range of about 0.005 to about 0.030 mm.

The staged roller contact for tooth profile 302 may be further assisted by providing a sprocket tooth pressure angle γ that is substantially less than the ISO-606 standard. Pressure angles γ equal to or very close to zero (0), or even negative pressure angles, are contemplated.

Figure 23:
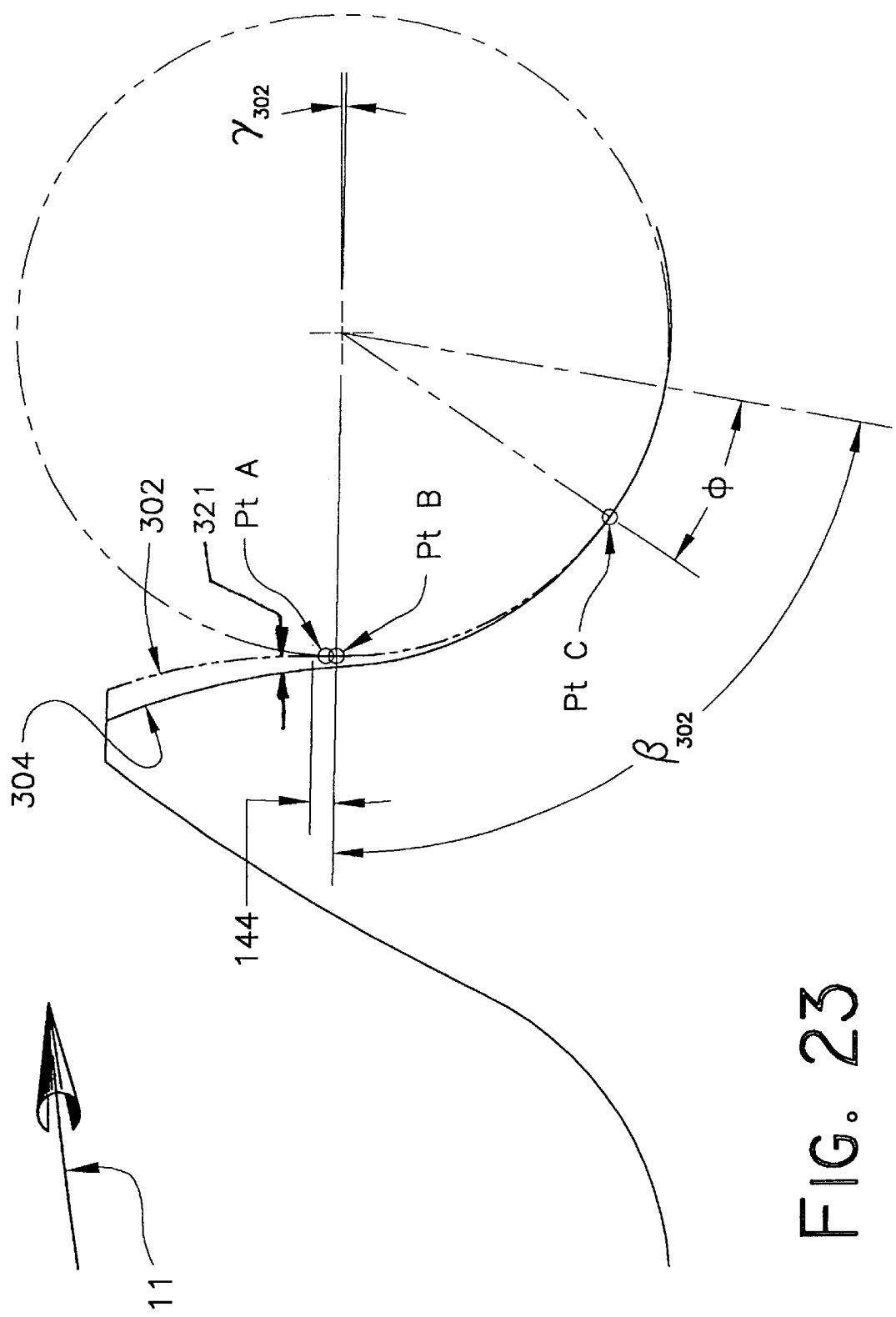
FIG. 23 illustrates the asymmetrical tooth space form of FIG. 9 overlaid with the asymmetrical tooth space form of FIG. 21.

FIG. 23 illustrates the tooth profile 304 overlaid with the tooth profile 302 (phantom). An engaging roller is shown at the onset of initial tangential contact at point A along the engaging flank of the tooth profile 302. The engaging roller will maintain contact with the engaging flank until it is at full mesh and seated at points B and C as previously described with reference to FIG. 9. The tooth profile 304 is overlaid on the tooth profile 302 to show that an engaging roller only has radial contact on the inclined root surface of the tooth profile 304 (see FIGS. 21a and 22) and does not have tangential contact with the tooth profile 304.

The pressure angle γ for tooth profile 304 has no functional purpose during the onset of roller meshing since the roller does not contact the engaging flank. The pressure angle $γ_{302}$ for the tooth profile 302 is shown as a negative value. Thus $γ_{min}$ may be a small negative value, and $γ_{max}$ may be a positive value equal to some value less than the ISO-606 minimum pressure angle γ. As a result, initial roller-to-sprocket contact for tooth profile 302 of sprocket 300 (FIG. 20) occurs at point A followed by full engagement contact at points B and C. The sprocket 300 may, or may not incorporate additional chordal pitch reduction, and may, or may not incorporate tooth space clearance (TSC), as described above.

Figure 24:
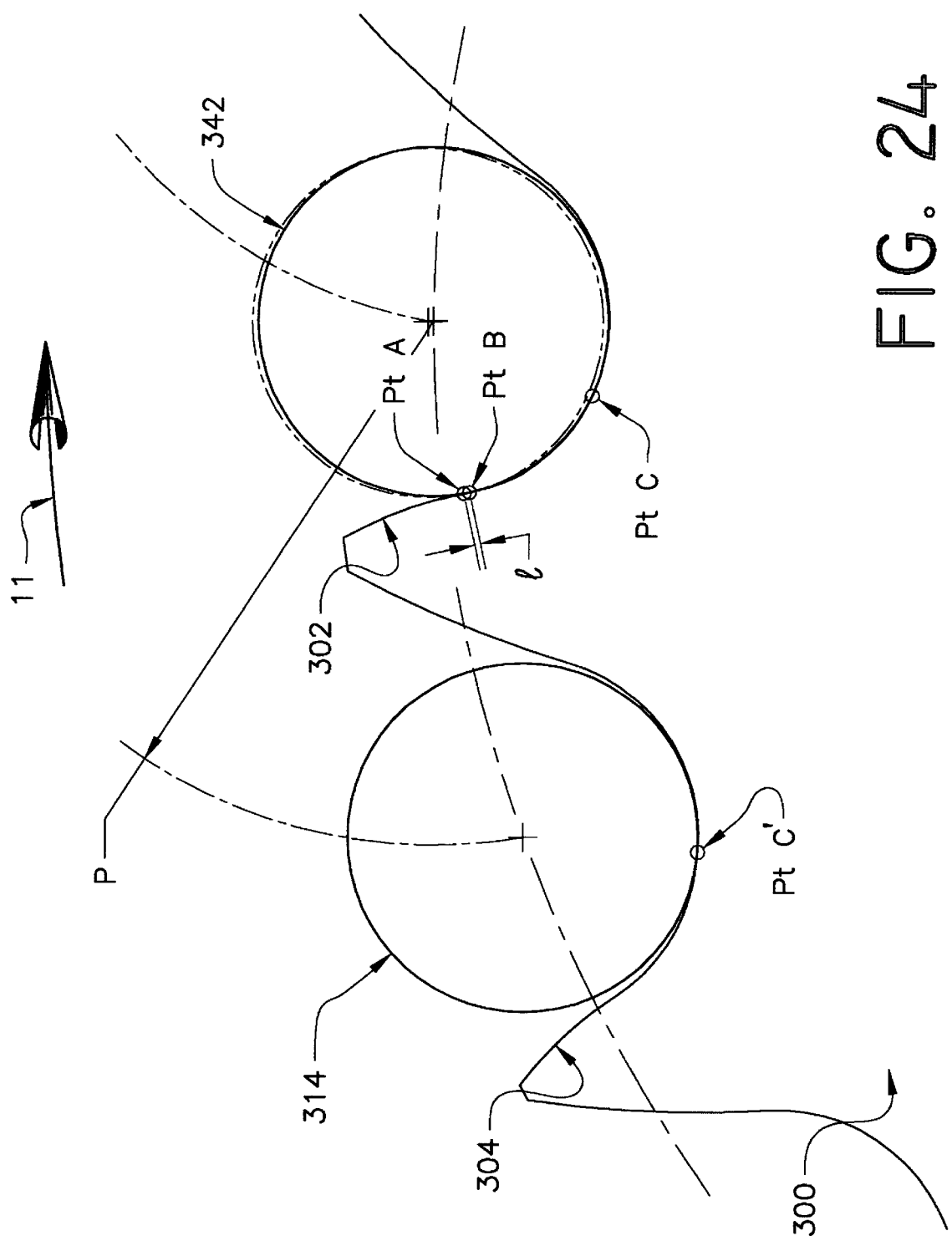
FIG. 24 illustrates the meshing progression of a first roller and the meshing of a second adjacent roller with the sprocket of FIG. 20 as the sprocket is rotated in a clockwise direction.

FIG. 24 shows the engagement path of an additional roller 342 from initial contact at point A (phantom) to fully-seated, two-point contact (solid) in a sprocket tooth 302, and an engagement path of the roller 314 engaging an adjacent sprocket tooth 304 of the random engagement sprocket 300. At the onset of meshing for roller 314, a small portion of the chain load transfer takes place with tooth 304 picking up a share of the loading. However, tooth 302 continues to carry a larger portion of the chain loading until an engaging roller meshes with another tooth 302 with its attendant flank contact. The reference 1 in FIG. 24 indicates the amount of "staging" for the tooth 302 from the initial contact at point A to the full mesh contact at points B and C.

Figure 25:
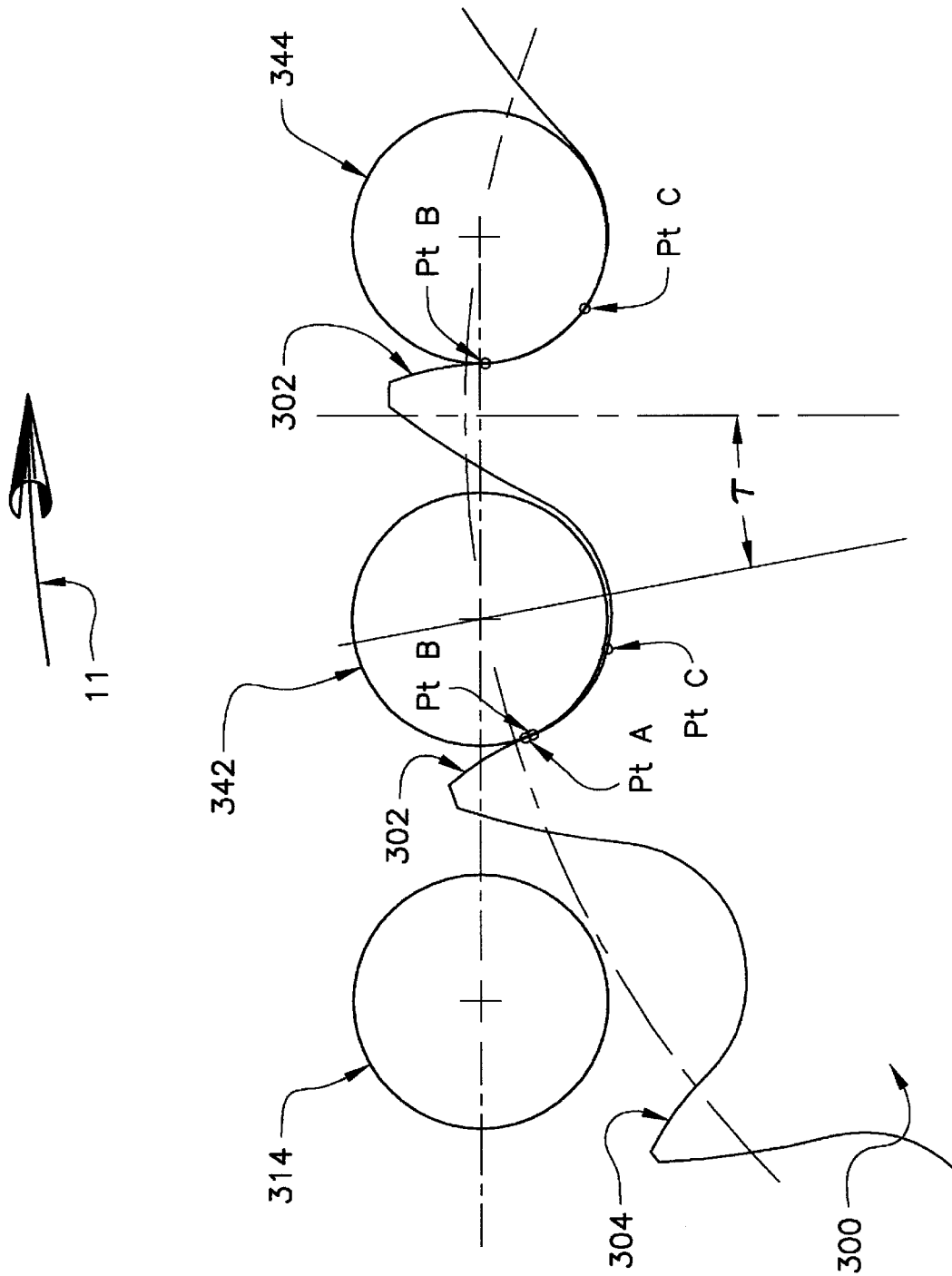
FIG. 25 illustrates the sprocket of FIG. 20 with a first roller in two-point contact, a second roller at initial tangential contact, and a third roller about to mesh with the drive sprocket.
Figure 26:
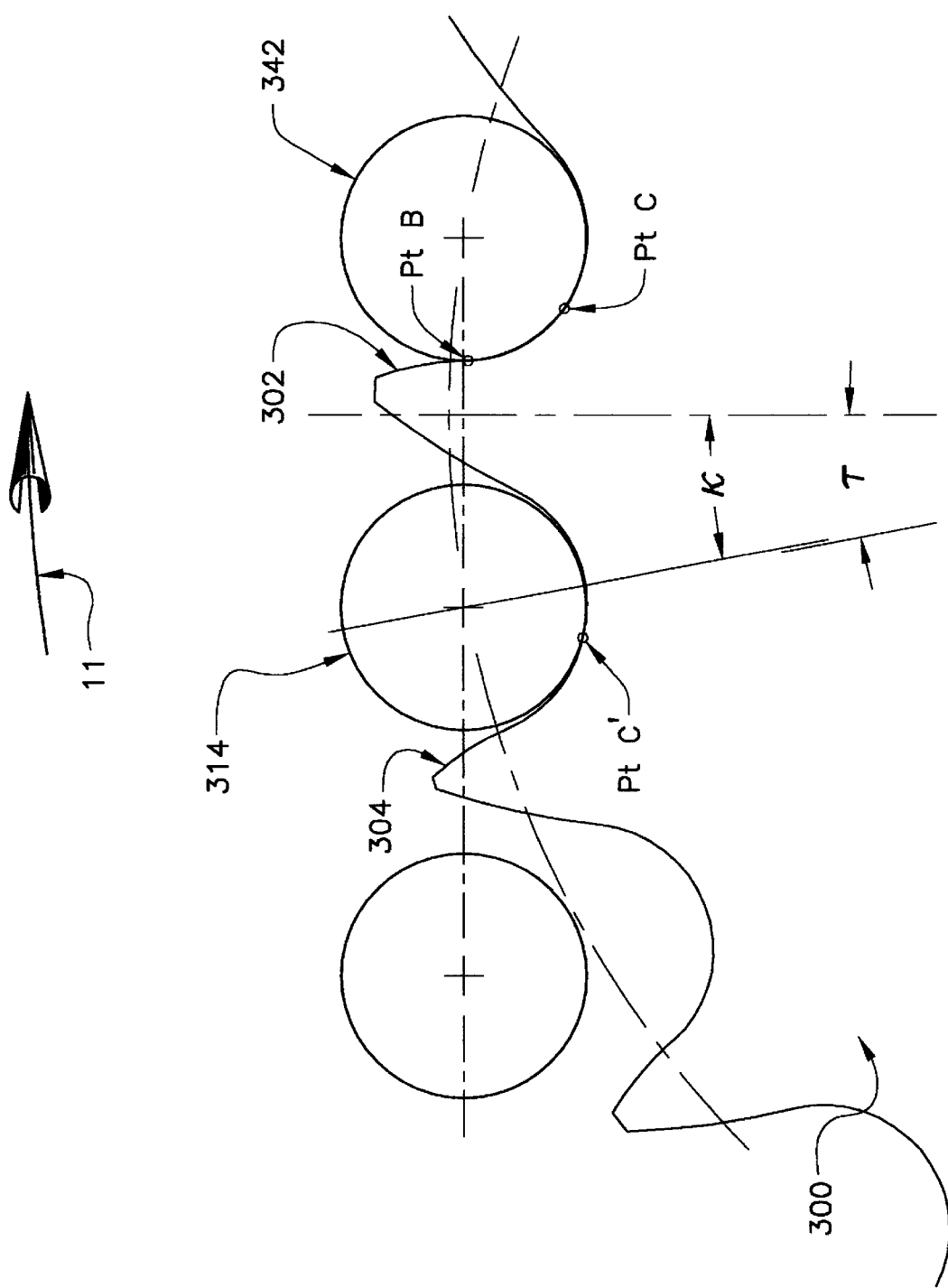
FIG. 26 illustrates the sprocket of FIG. 25 rotated in a clockwise direction until the instant of initial engagement of the third roller at a root surface of the sprocket.

FIGS. 25 and 26 illustrate the meshing delay between the tooth profiles 302, 304. In particular, as shown in FIG. 25, the sprocket 300 has a further roller 344 fully-seated in two-point contact with a sprocket tooth incorporating the tooth profile 302. The roller 342 is shown at the instant of initial tangential contact at point A of a second sprocket tooth also incorporating the tooth profile 302. The roller 314 is the next roller in the span and will mesh with a sprocket tooth incorporating the tooth profile 304. The sprocket 300 must rotate through an angle τ for roller 342 to move from its initial contact position at point A to full mesh, seated in two-point contact with the tooth profile 302 at a 12 o'clock position.

With reference to FIG. 26, the sprocket 300 of FIG. 25 is shown rotated in a clockwise direction until roller 314 is at the onset of meshing with the tooth profile 304. The sprocket 300 must now rotate through a smaller angle κ to have roller 314 seated at the 12 o'clock position. Thus, the sprocket 300 must rotate through an additional angle τ-κ for an engaging roller to be fully seated in the tooth profile 302.

Referring again to FIG. 20, the two sets of tooth profiles 302, 304 are arranged in a random pattern in order to modify the meshing impact frequency by altering the point and rhythm of initial roller-to-sprocket contact. However, the two sets of tooth profiles 302, 304 could be arranged in many different random patterns. Further, it is also contemplated that the two sets of tooth profiles 302, 304 could be arranged in many regular patterns that would work equally as well. In all cases, the arrangement of two sets of different tooth profiles on a sprocket provides a means for breaking up the mesh frequency impact noise normally associated with and induced by a full complement of substantially identically shaped sprocket teeth. The mesh frequency noise reduction is achieved by altering the point and rhythm of initial roller-to-sprocket contact.

The crankshaft sprocket, generally the smallest sprocket in the chain drive, is usually the major noise contributor. The typically larger driven camshaft sprocket, however, will also contribute to the generated noise levels, but generally to a lesser extent than the crankshaft sprocket. However, the driven sprocket, particularly if it is nearly the same size or smaller than the driving sprocket, may be the prime noise generator, as in the case with balance shaft sprockets and pump sprockets. Thus, the features of the present invention may also be used advantageously with camshaft or other driven sprockets as well.

It should be appreciated that the tooth profile features of FIGS. 20–26 can be altered slightly without substantially deviating from the chain and sprocket meshing kinematics that produce the noise reduction advantages of the present invention. For example, the engaging asymmetrical flank profile could be approximated by an involute form, and the disengaging asymmetrical flank profile could be approximated by a different involute form. Slight changes to the profile may be done for manufacturing and/or quality control reasons—or simply to improve part dimensioning.

The invention has been described with reference to the preferred embodiments. Obviously, modifications will occur to others upon a reading and understanding of this specification and this invention is intended to include same insofar as they come within the scope of the appended claims or the equivalents thereof.

What is claimed is:

1. A sprocket comprising:
   a first plurality of teeth each having a first engaging flank and a first disengaging flank that are shaped to define a first tooth profile;
   a second plurality of teeth each having a second engaging flank and a second disengaging flank that are shaped to define a second tooth profile different from said first tooth profile;
   one of said first plurality of teeth cooperating with a first adjacent tooth to define a first tooth space wherein an associated roller chain roller contacts an engaging flank of said one of the first plurality of teeth when seated in driving contact within said first tooth space; and
   one of said second plurality of teeth cooperating with a second adjacent tooth to define a second tooth space wherein an associated roller chain roller is spaced apart from an engaging flank of said one of the second plurality of teeth to define a clearance therebetween when seated in driving contact within said second tooth space.

2. The sprocket of claim 1, wherein the first adjacent tooth is another one of the first plurality of sprocket teeth.

3. The sprocket of claim 1, wherein the first adjacent tooth is another one of the second plurality of sprocket teeth.

4. The sprocket of claim 1, wherein said first and second tooth profiles are asymmetrical tooth profiles.

5. The sprocket of claim 1, wherein said first tooth space includes:
   a first flat surface tangent to and extending radially inward of said engaging flank of said one of the first plurality of teeth;
   a first root surface portion tangent to and extending radially inward of said first flat surface;
   a second flat surface tangent to and extending radially inward of said first root surface; and
   a second root surface portion tangent to and extending radially inward of said second flat surface.

6. The sprocket of claim 1, wherein said second tooth space includes:
   a first root surface portion tangent to and extending radially inward of said engaging flank of said one of the second plurality of teeth;
   a first flat surface tangent to and extending radially inward of said first root surface portion; and
   a second root surface portion tangent to and extending radially inward of said first flat surface.

7. The sprocket of claim 5, wherein a radius defining said first root surface portion is less than a radius of an associated roller chain roller so that a clearance exists between said first root surface portion and the associated roller chain roller when the associated roller chain roller is seated in driving contact within said first tooth space.

8. The sprocket of claim 5, wherein said first flat surface includes:
   a first portion that promotes a staged impact between an associated roller chain roller and the sprocket, said staged impact including an initial tangential impact along said first flat surface followed by a subsequent radial impact; and
   a second portion that permits an associated roller chain roller to seat in two-point driving contact within said first tooth space.

9. The sprocket of claim 5, wherein said second flat surface includes:
   a first portion that provides tooth space clearance; and
   a second portion that permits an associated roller chain roller to seat in two-point driving contact within said first tooth space.

10. The sprocket of claim 5, wherein said first tooth space further includes a third flat surface tangent to and extending radially outward of said second root surface portion, said third flat surface providing tooth space clearance.

11. The sprocket of claim 5, wherein said first tooth space further includes a third flat surface tangent to and extending radially outward of said second root surface portion, said third flat surface cooperating with said second flat surface to provide tooth space clearance.

12. The sprocket of claim 5, wherein said second tooth space includes:
   a third root surface portion tangent to and extending radially inward of said engaging flank of said one of the second plurality of teeth;
   a third flat surface tangent to and extending radially inward of said third root surface portion; and
   a fourth root surface portion tangent to and extending radially inward of said third flat surface.

13. The sprocket of claim 6, wherein said first flat surface includes:
   a first portion that provides tooth space clearance; and
   a second portion that facilitates providing said clearance between an associated roller chain roller said engaging flank of said one of the second plurality of teeth.

14. The sprocket of claim 6, wherein said second tooth space further includes a second flat surface tangent to and extending radially outward of said second root surface portion, said second flat surface providing tooth space clearance.

15. The sprocket of claim 6, wherein said second tooth space further includes a second flat surface tangent to and extending radially outward of said second root surface portion, said second flat surface cooperating with said first flat surface to provide tooth space clearance.

16. A unidirectional roller chain drive system comprising:

a drive sprocket;

a driven sprocket;

a roller chain having rollers in meshing contact with the drive sprocket and the driven sprocket; and at least one of the drive sprocket and driven sprocket having a first plurality of teeth with a first engaging flank and a first disengaging flank that are shaped to define a first tooth profile, and a second plurality of teeth with a second engaging flank and a second disengaging flank that are shaped to define a second tooth profile different from said first tooth profile;

one of said first plurality of teeth cooperating with a first adjacent tooth to define a first tooth space wherein an associated roller chain roller contacts an engaging flank of said one of the first plurality of teeth when seated in driving contact within said first tooth space; and one of said second plurality of teeth cooperating with a second adjacent tooth to define a second tooth space wherein an associated roller chain roller is spaced apart from an engaging flank of said one of the second plurality of teeth to define a clearance therebetween when seated in driving contact within said second tooth space.

17. The drive system of claim 16, wherein said first tooth space includes:

a first flat surface tangent to and extending radially inward of said engaging flank of said one of the first plurality of teeth;

a first root surface portion tangent to and extending radially inward of said first flat surface;

a second flat surface tangent to and extending radially inward of said first root surface; and a second root surface portion tangent to and extending radially inward of said second flat surface.

18. The drive system of claim 16, wherein said first and second tooth profiles are asymmetrical tooth profiles.

19. The drive system of claim 17, wherein said second tooth space includes:

a third root surface portion tangent to and extending radially inward of said engaging flank of said one of the second plurality of teeth;

a third flat surface tangent to and extending radially inward of said third root surface portion; and a fourth root surface portion tangent to and extending radially inward of said third flat surface.

20. The drive system of claim 17, wherein a radius defining said first root surface portion is less than a radius of an associated roller chain roller so that a clearance exists between said first root surface portion and the associated roller chain roller when the associated roller chain roller is seated in driving contact within said first tooth space.

* * * * *